United States Patent
Chong et al.

(10) Patent No.: US 9,591,331 B2
(45) Date of Patent: Mar. 7, 2017

(54) MERGE SIGNALING AND LOOP FILTER ON/OFF SIGNALING

(71) Applicant: QUALCOMM Incorporated, San Diego, CA (US)

(72) Inventors: In Suk Chong, San Diego, CA (US); Jaehong Chon, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 13/829,774

(22) Filed: Mar. 14, 2013

(65) Prior Publication Data

US 2013/0258049 A1    Oct. 3, 2013

Related U.S. Application Data

(60) Provisional application No. 61/616,998, filed on Mar. 28, 2012, provisional application No. 61/662,218, filed on Jun. 20, 2012.

(51) Int. Cl.

| | | |
|---|---|---|
| *H04N 19/70* | (2014.01) | |
| *H04N 19/82* | (2014.01) | |
| *H04N 19/174* | (2014.01) | |
| *H04N 19/80* | (2014.01) | |
| *H04N 19/176* | (2014.01) | |
| *H04N 19/117* | (2014.01) | |

(52) U.S. Cl.
CPC ........... *H04N 19/70* (2014.11); *H04N 19/174* (2014.11); *H04N 19/176* (2014.11); *H04N 19/80* (2014.11); *H04N 19/82* (2014.11); *H04N 19/117* (2014.11)

(58) Field of Classification Search
None
See application file for complete search history.

(56) References Cited

U.S. PATENT DOCUMENTS

2012/0257058 A1* 10/2012 Kinoshita ............. H04N 7/181
348/148
2012/0294353 A1* 11/2012 Fu ......................... H04N 19/70
375/240.02

(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — David N Werner
(74) *Attorney, Agent, or Firm* — Shumaker & Sieffert, P.A.

(57) ABSTRACT

Systems, methods, and devices are disclosed that encode video, decode video, or both. These systems, methods, and devices generate and/or receive an enable syntax element in an encoded bitstream, wherein the enable syntax element indicates whether a loop filter is turned on or turned off for a group of video blocks. They also generate or receive one or more additional syntax elements identifying parameters for the loop filter for the group of video blocks in response to the enable syntax element indicating the loop filter is turned on for the group of video blocks. These systems, methods, and devices also perform the loop filter for the group of video blocks based on the received enable syntax element.

39 Claims, 9 Drawing Sheets

(56) References Cited

U.S. PATENT DOCUMENTS

| | | | |
|---|---|---|---|
| 2013/0101016 A1* | 4/2013 | Chong | H04N 19/82 375/240.02 |
| 2013/0114678 A1* | 5/2013 | Baylon | H04N 19/176 375/240.02 |
| 2013/0215974 A1* | 8/2013 | Chong | H04N 19/463 375/240.24 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "CE8 Subset2: A Joint Proposal on Improving the Adaptive Loop Filter in TMuC0.9 by MediaTek, Qaualcomm, and Toshiba", JCT-VC Meeting; MPEG Meeting; Jan. 20-28, 2011; Daegu;(Joint Collaborative Team on Video Coding of ISO/IEC JTC1/SC29/WG11and ITU-T SG.16 ); URL: http://wftp3.1tu.int/av-arch/jctvc-site/, No. JCTVC-D119, 18 pp.

Chen et al., "CE8.a.1: One-stage SAO and ALF with LCU-based syntax", JCT-VC Meeting; MPEG Meeting; Feb. 1-10, 2012; San Jose; (Joint Collaborative Team on Video Coding of ISO/IEC JTC1/SC29/WG11 and ITU-T SG.16 ); URL: http://wftp3.1tu.int/av-arch/jctvc-site/, No. JCTVC-H0272, 7 pp.

Chen et al., "CE8.a.4: One-stage/Two-stage SAO and ALF with LCU-based syntax", JCT-VC Meeting; MPEG Meeting; Feb. 1-10, 2012, San Jose; (Joint Collaborative Team on Video Coding of ISO/IEC JTC1/SC29/WG11 and ITU-T SG.16); URL: http://wftp3.1tu.int/av-arch/jctvc-site/,, No. JCTVC-H0274, 18 pp.

Fu et al., "Sample Adaptive Offset with LCU-based Syntax", JCT-VC Meeting; MPEG Meeting; Jul. 14-22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC F056, 6 pp.

Fu et al., "CE13: Sample Adaptive Offset with LCU-Independent Decoding," Document: JCTVC-E049 Joint Collaborative Team on Video Coding (JCT-VC) of ITU-T SG16 WP3 and ISO/IEC JTC1/SC29/WG11, 5th Meeting: Geneva, CH, Mar. 16-23, 2011, 6 pp.

International Search Report and Written Opinion—PCT/US2013/033325—ISA/EPO—Jun. 13, 2013, 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Vatis et al., "Syntax of adaptive filter coefficients in the KTA reference model", Joint Video Team (JVT) of ISO/IEC MPEG & ITU-T VCEG(ISO/IEC JTC1/SC29/WG11 and ITU-T SG16 Q6), No. VCEG-AF09, Apr. 20-21, 2007, 5 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Fuldseth, et al., "CE8.a.2: ALF with LCU-based syntax", 8. JCT-VC Meeting; MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-H0066, XP030111093, 5 pp.

International Preliminary Report on Patentability from International Application No. PCT/US2013/033325, dated Aug. 5, 2014, 9 pp.

Second Written Opinion from International Application No. PCT/US2013/033325, dated Mar. 14, 2014, 7 pp.

Chong et al., "CE2.a.1: Signalling mode change from slice header mode to interleaving mode," Joint Collaborative Team on Video Coding (JCT-VC); 9th Meeting: Geneva, CH; Apr. 27-May 7, 2012; Document: JCTVC-I0249, Apr. 16, 2012, 6 pp.

Hsu et al., "Non-CE1: Decoupling SAO on/off from SAO type with neighbor-based contexts," Joint Collaborative Team on Video Coding (JCT-VC); 9th Meeting: Geneva, CH; Apr. 27-May 7, 2012, Document: JCTVC-I0199, Apr. 27, 2012, 5 pp.

Kim et al., "Non-CE1: LCU SAO Enable Flag Coding," Joint Collaborative Team on Video Coding (JCT-VC); 9th Meeting; Geneva, CH; Apr. 27-May 7, 2012; Document: JCTVC-I0193, Apr. 17, 2012, 10 pp.

Huang et al., "Description of Core Experiment 1 (CE1): Sample adaptive offset filtering," Joint Collaborative Team on Video Coding (JCT-VC); 8th Meeting; San Jose, CA; Feb. 1-10, 2012; Document: JCTVC-H1101, Mar. 10, 2012, 10 pp.

* cited by examiner

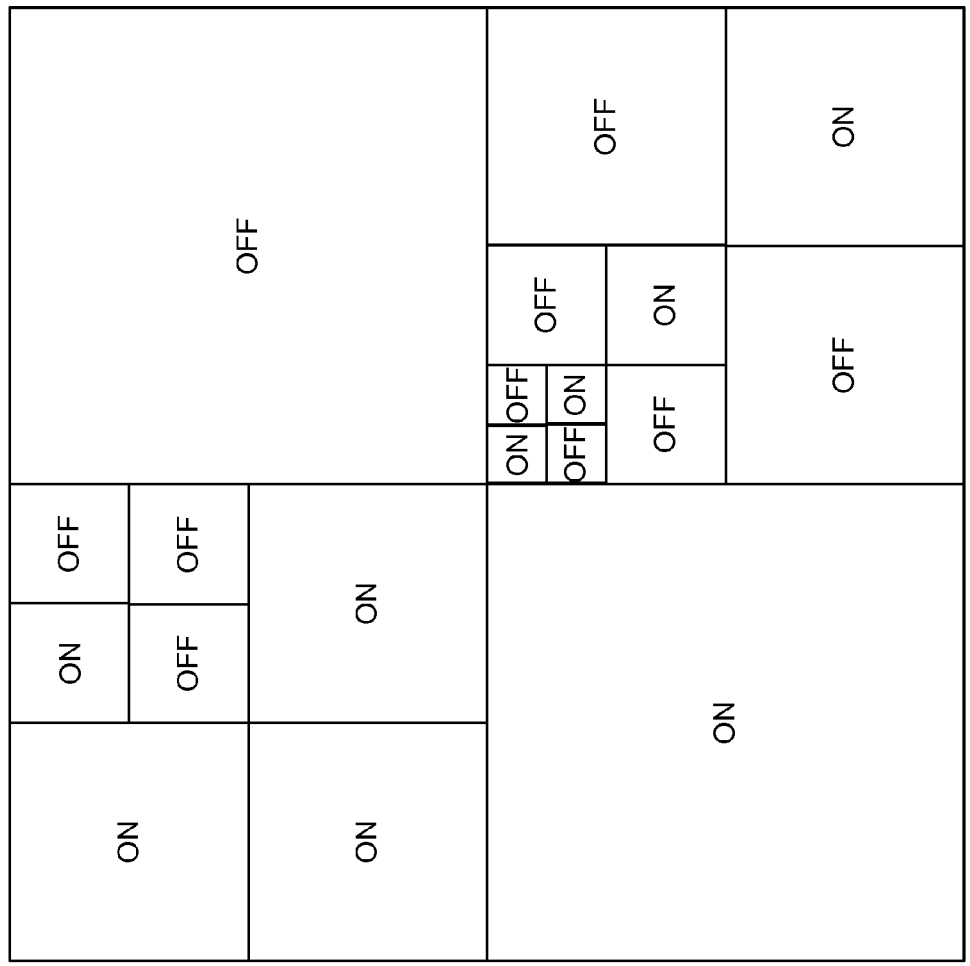
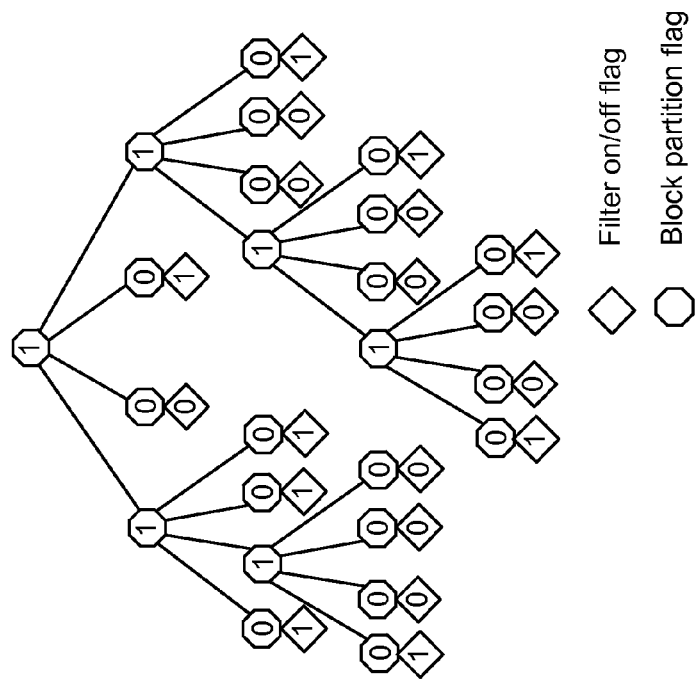
FIG. 2C
FIG. 2D

SAO_EO_0

SAO_EO_1

SAO_EO_2

SAO_EO_3

FIG. 3

MERGE SIGNALING AND LOOP FILTER ON/OFF SIGNALING

RELATED APPLICATIONS

This application claims the benefit of:
U.S. Provisional Application No. 61/616,998, filed Mar. 28, 2012 and
U.S. Provisional Application No. 61/662,218, filed Jun. 20, 2012,
the entire content of each is incorporated herein by reference.

TECHNICAL FIELD

This disclosure relates to video coding and more particularly to techniques for signaling loop filter parameters.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to video coding and more particularly to techniques for signaling sample adaptive offset (SAO) parameters and adaptive loop filter (ALF) parameters. One example of the disclosure relates to the introduction of an SAO on/off flag that is signaled before other SAO parameters (e.g., at the LCU level) to indicate whether SAO is used for any blocks in the LCU. Another example of the disclosure is related to the introduction of an ALF on/off flag that is signaled before other ALF parameters (e.g., at the LCU level) to indicate whether ALF is used for any blocks in the LCU.

In one example, the disclosure describes a method including generating, for inclusion in an encoded bitstream, an enable syntax element, wherein the enable syntax element indicates whether a loop filter is turned on or turned off for a group of video blocks; and in response to the enable syntax element indicating the loop filter is turned on for the group of video blocks, generating one or more additional syntax elements identifying parameters for the loop filter for the group of video blocks.

In another example, the disclosure describes a device for encoding video including a processor configured to generate, for inclusion in an encoded bitstream, an enable syntax element, wherein the enable syntax element indicates whether a loop filter is turned on or turned off for a group of video blocks and to generate one or more additional syntax elements identifying parameters for the loop filter for the group of video blocks in response to the enable syntax element indicating the loop filter is turned on for the group of video blocks.

In another example, the disclosure describes a device for encoding video, the device including means for generating, for inclusion in an encoded bitstream, an enable syntax element, wherein the enable syntax element indicates whether a loop filter is turned on or turned off for a group of video blocks, and means for generating one or more additional syntax elements identifying parameters for the loop filter for the group of video blocks in response to the enable syntax element indicating the loop filter is turned on for the group of video blocks.

In another example, the disclosure describes a computer-readable storage medium. The computer-readable storage medium having stored thereon instructions that upon execution cause one or more processors to generate, for inclusion in an encoded bitstream, an enable syntax element, wherein the enable syntax element indicates whether a loop filter is turned on or turned off for a group of video blocks and generating one or more additional syntax elements identifying parameters for the loop filter for the group of video blocks in response to the enable syntax element indicating the loop filter is turned on for the group of video blocks.

The details of one or more examples are set forth in the accompanying drawings and the description below. Other features, objects, and advantages will be apparent from the description and drawings, and from the claims.

BRIEF DESCRIPTION OF DRAWINGS

FIGS. 2C and 2D are conceptual diagrams illustrating an example of a filter map for a series of video blocks corresponding to the example quadtree partitioning of FIGS. 2A and 2B.

FIG. 3 is a conceptual diagram showing four possible edge offset types for SAO coding.

DETAILED DESCRIPTION

Figure 1:
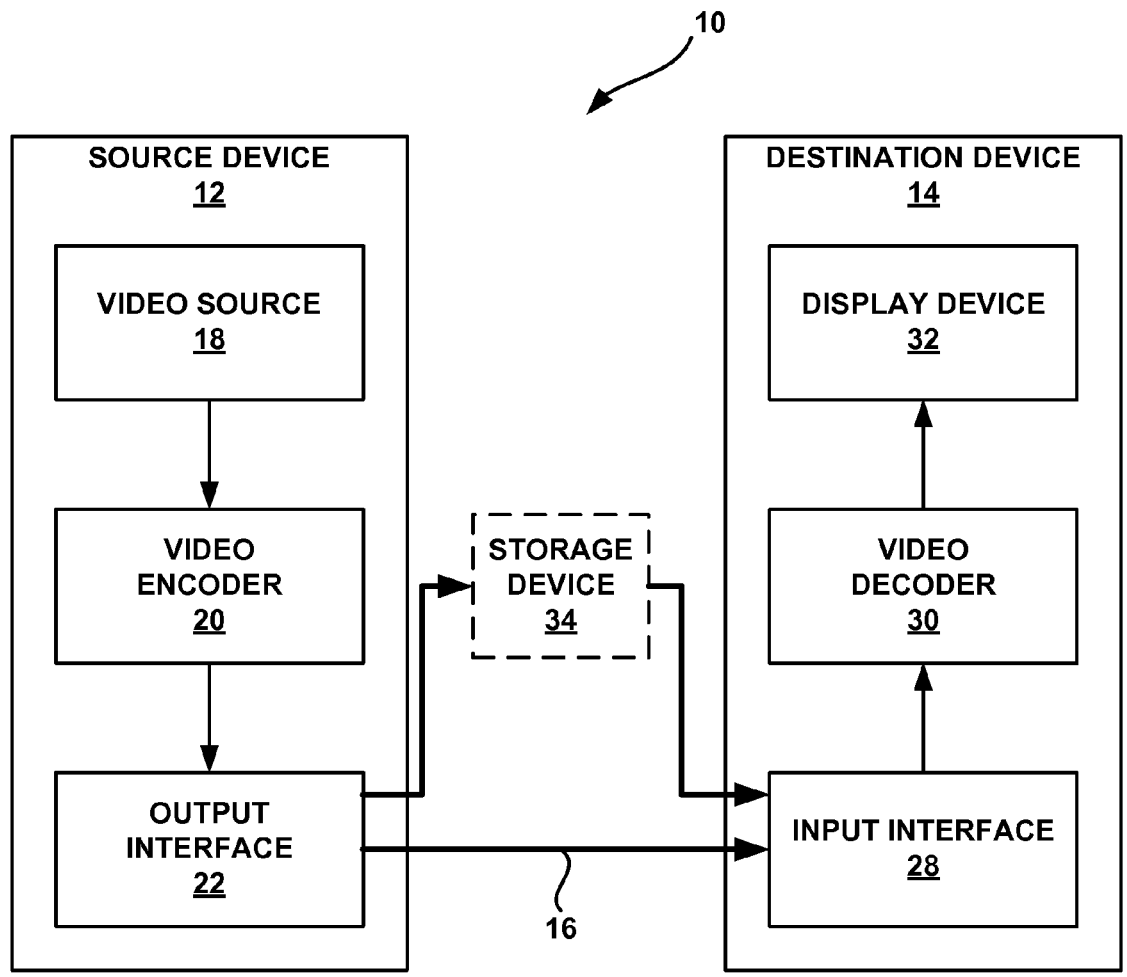
FIG. 1 is a block diagram illustrating an example video encoding and decoding system that may utilize the techniques described in this disclosure.

This disclosure relates to video coding, and more particularly to techniques for signaling loop filter parameters. Some examples relate to techniques for signaling sample adaptive offset (SAO) parameters and adaptive loop filter (ALF) parameters. One example of the disclosure relates to the introduction of an SAO on/off flag that is signaled before other SAO parameters (e.g., at the LCU level) to indicate whether SAO is used for any blocks in the LCU. Another example of the disclosure is related to the introduction of an ALF on/off flag that is signaled before other ALF parameters (e.g., at the LCU level) to indicate whether ALF is used for any blocks in the LCU.

In various examples, the disclosure describes systems and methods that may generate, for inclusion in an encoded bitstream, an enable syntax element, wherein the enable syntax element indicates whether a loop filter is turned on or turned off for a group of video blocks. In response to the enable syntax element indicating the loop filter is turned on for the group of video blocks, the techniques of this disclosure may further include generating one or more additional syntax elements identifying parameters for the loop filter for the group of video blocks.

In the SAO and ALF a merge signal (e.g., merge_left or merge_up) may be used. A merge_left syntax element may, for example, indicate if the filter parameters for a current group of video blocks are to be borrowed from the filter parameters for a previously coded group of video blocks to the left of the current group, while a merge_up syntax element can indicate if the filter parameters for the current group of video blocks are to be borrowed from the filter parameters for a previously coded group of video blocks located above the current group. If one of the merge types is not chosen (i.e., the current parameters are to be borrowed from the parameters for the left or upper already coded group of video blocks), then loop filter on/off indicators and offsets/coefficients are subsequently signaled.

If merge is not chosen, filter (or offset) on/off signaling and filter (offset) coefficients may be followed. This may result in redundant signaling of merge signals when all or many blocks within an LCU or partition are not applying SAO and/or ALF.

This disclosure relates to video coding and more particularly to techniques for signaling sample adaptive offset (SAO) parameters and adaptive loop filter (ALF) parameters. One example of the disclosure relates to the introduction of an SAO on/off flag that is signaled before other SAO parameters (e.g., at the LCU level) to indicate whether SAO is used for any blocks in the LCU. Another example of the disclosure relates to the introduction of an ALF on/off flag that is signaled before other ALF parameters (e.g., at the LCU level) to indicate whether ALF is used for any blocks in the LCU.

According to techniques of the present disclosure, a syntax element indicating if a loop filter (e.g., SAO or ALF) is enabled can be signaled in the encoded video bitstream prior to the other loop filter parameters (e.g., merge syntax elements). In an example, an sao_enable_flag indicating whether or not SAO is enabled for a group of video blocks (e.g., an LCU or a partition) is first signaled for use by a decoder. If the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left video block or an upper video block, then the filter parameters may be signaled as described herein. In some examples, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element. The specific techniques of this disclosure for SAO and ALF signaling will be described in more detail below.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by source device 12, e.g., in video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

According to techniques of the present disclosure, a syntax element indicating if a loop filter (e.g., SAO or ALF) is enabled can be transmitted from video encoder 20 to video decoder 30 prior to other elements. In an example, an sao_enable_flag indicating whether or not SAO is enabled for a group of video blocks (e.g. an LCU or a partition) is first transmitted by encoder 20 and received by decoder 30. If the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left video block or an upper video block, then the filter parameters can be signaled. In an example, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element.

One example of the techniques described in this disclosure relates to the introduction of an SAO on/off flag that may be signaled first by source device 12 (e.g., at the LCU level) to indicate whether SAO is used for any blocks in the LCU. Another example of the techniques described in this disclosure relates to the introduction of an ALF on/off flag that is signaled first by source device 12 (e.g., at the LCU level) to indicate whether SAO is used for any blocks in the LCU.

In one example SAO implementation, each partition (which may include one or more LCUs) can have one of three offset types (also called pixel classification): no offset, band classification based offset type 0/1, and edge classification based type 0/1/2/3. Each band classification offset type has 16 possible offset values, while each edge classification based type has four possible offset values. If one of these offset types is chosen to be used for the partition, information indicating the corresponding offset type and the offset values are sent to the decoder.

SAO with LCU-based syntax has been proposed. This technique supports picture-based SAO encoding for higher coding efficiency (bottom-up merge picture quadtree) and LCU-based encoding for lower complexity or sub-picture latency. Each LCU is allowed to change SAO parameters by sending its own SAO type and offsets. In some examples of LCU-based SAO encoding, each LCU may only use causal data to derive SAO parameters. For example, LCUs to the right and bottom cannot be utilized and neither can the last four pixel rows of each LCU due to deblocking.

HEVC is being developed by the Joint Collaboration Team on Video Coding (JCT-VC) of ITU-T Video Coding Experts Group (VCEG) and ISO/IEC Motion Picture Experts Group (MPEG) is described in various working drafts. A recent draft of the HEVC standard, referred to as "HEVC Working Draft 9" or "WD9," is described in document JCTVC-K1003v13, Bross et al., "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, Conn., 10-19 Oct. 2012, which, as of Dec. 27, 2012, is downloadable from http://phenix.int-evry.fr/jct/doc_end_user/documents/11_Shanghai/wg11/JCTVC-K1003-v13.zip, the entire content of which is incorporated herein by reference. The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

Data for nodes of quadtree 250 may describe whether the CU corresponding to the node is split. If the CU is split, four additional nodes may be present in quadtree 250. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 250, an array of split flag values may be 101000000.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

Figure 2A:
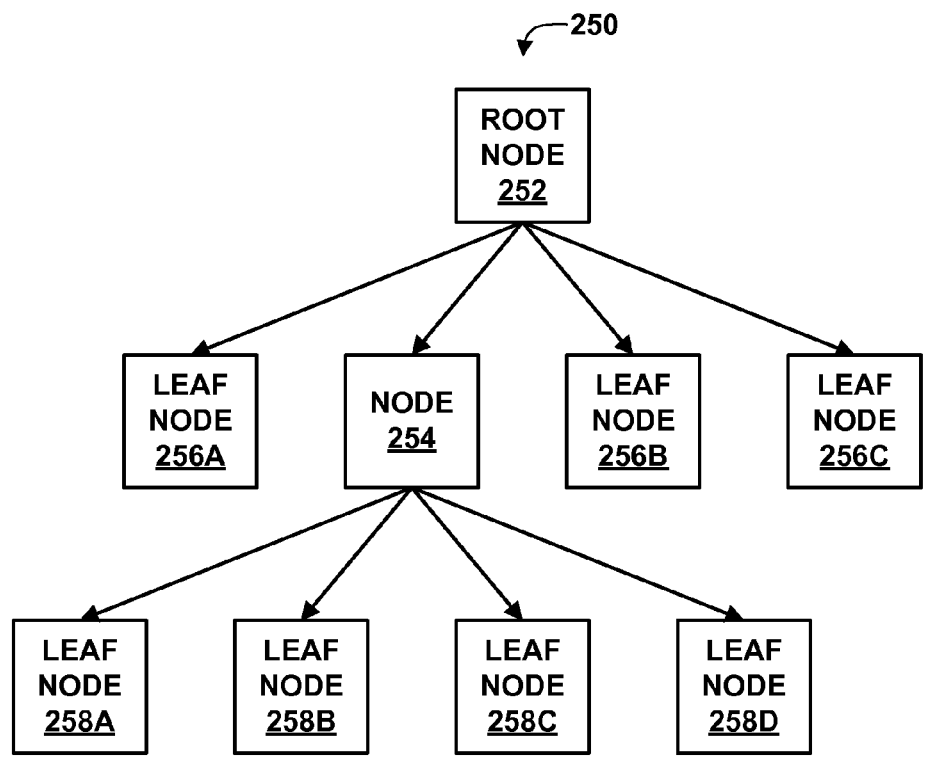
FIGS. 2A and 2B are conceptual diagrams illustrating an example of quadtree partitioning applied to a largest coding unit (LCU).
Figure 2B:
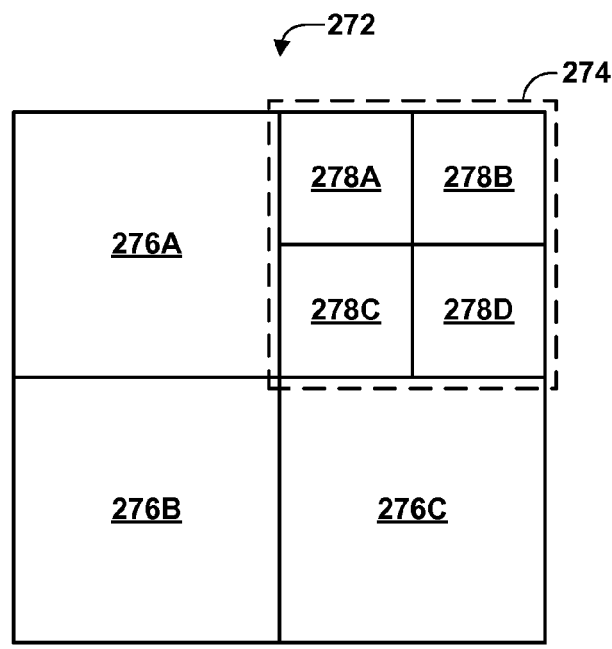
Figure 4:
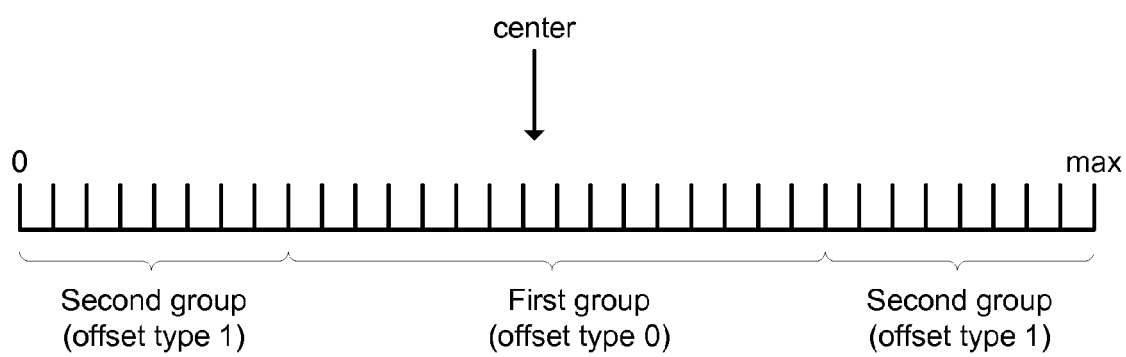
FIG. 4 is a conceptual diagram showing example band offset types for SAO coding.

FIGS. 2A and 2B are conceptual diagrams illustrating an example quadtree structure 250 and a corresponding LCU 272. FIG. 2A depicts an example quadtree 250, which includes nodes arranged in a hierarchical fashion. Each node in a quadtree, such as quadtree 250, may be a leaf node with no children, or have four child nodes. In the example of FIG. 2A, quadtree 250 includes root node 252. Root node 252 has four child nodes, including leaf nodes 256A-256C (leaf nodes 256) and node 254. Because node 254 is not a leaf node, node 254 includes four child nodes, which in this example, are leaf nodes 258A-258D (leaf nodes 258).

Quadtree 250 may include data describing characteristics of a corresponding LCU, such as LCU 272 in this example. For example, quadtree 250, by its structure, may describe splitting of the LCU into sub-CUs. Assume that LCU 272 has a size of 2N×2N. LCU 272, in this example, has four sub-CUs 276A-276C (sub-CUs 276) and 274, each of size N×N. Sub-CU 274 is further split into four sub-CUs 278A-278D (sub-CUs 278), each of size N/2×N/2. The structure of quadtree 250 corresponds to the splitting of LCU 272, in this example. That is, root node 252 corresponds to LCU 272, leaf nodes 256 correspond to sub-CUs 276, node 254 corresponds to sub-CU 274, and leaf nodes 258 correspond to sub-CUs 278.

A slice may be divided into video blocks (or LCUs) and each video block may be partitioned according to the quadtree structure described in relation to FIGS. 2A-B. Additionally, as shown in FIG. 2C, the quadtree sub-blocks indicated by "ON" may be filtered by loop filters described herein, while quadtree sub-blocks indicated by "OFF" may not be filtered. The decision of whether or not to filter a given block or sub-block may be determined at the encoder by comparing the filtered result and the non-filtered result relative to the original block being coded. FIG. 2D is a decision tree representing partitioning decisions that results in the quadtree partitioning shown in FIG. 2C. The actual filtering applied to any pixels for "ON" blocks, may be determined based on the metrics discussed herein.

In particular, FIG. 2C may represent a relatively large video block that is partitioned according to a quadtree portioning scheme into smaller video blocks of varying sizes. Each video block is labelled (on or off) in FIG. 2C, to illustrate whether filtering should be applied or avoided for that video block. The video encoder may define this filter map by comparing filtered and unfiltered versions of each video block to the original video block being coded.

Again, FIG. 2D is a decision tree corresponding to partitioning decisions that result in the quadtree partitioning shown in FIG. 2C. In FIG. 2D, each circle may correspond to a CU. If the circle includes a "1" flag, then that CU is further partitioned into four more CUs, but if the circle includes a "0" flag, then that CU is not partitioned any further. Each circle (e.g., corresponding to CUs) also includes an associated diamond. If the flag in the diamond for a given CU is set to 1, then filtering is turned "ON" for that CU, but if the flag in the diamond for a given CU is set to 0, then filtering is turned off. In this manner, FIGS. 2C and 2D may be individually or collectively viewed as a filter map that can be generated at an encoder and communicated to a decoder at least once per slice of encoded video data in order to communicate the level of quadtree partitioning for a given video block (e.g., an LCU) whether or not to apply filtering to each partitioned video block (e.g., each CU within the LCU).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Sample adaptive offset (SAO) coding is currently under consideration for adoption into the HEVC standard. In general, the addition of offset values to pixels in a video frame (e.g., a predictive frame for inter-prediction or intra-prediction) may improve coding during illumination changes between frames of a video sequence, e.g., such as during flashes, a darkening sky, or other types of illumination changes between frames. SAO filtering may also be used as a smoothing filtering to improve video quality. Previous video coding standards, such as H.264, applied offset types and values uniformly across entire blocks or frames of pixels. SAO techniques allow for different offset values to be applied to different pixels (or blocks) depending on pixel (or block) classification metrics. Possible classification metrics include activity metrics such as edge metrics and band metrics. A description of offset classifications can be found in C.-M. Fu, C.-Y. Chen, C.-Y. Tsai, Y.-W. Huang, S. Lei, "CE13: Sample Adaptive Offset with LCU-Independent Decoding," JCT-VC Contribution, E049, Geneva, February 2011, which is hereby incorporated by reference in its entirety.

In one example SAO implementation, each partition (which consists of a set of LCUs) can have one of three offset types (also called pixel classification): no offset, band classification based offset type 0/1, and edge classification based type 0/1/2/3. Each band classification offset type has 16 possible offset values, while each edge classification based type has 4 possible offset values. If one of these offset types is chosen to be used for the partition, information indicating the corresponding offset type and the offset values are sent to the decoder. The edge offset type classifies each pixel based on edge information.

Figure 3:
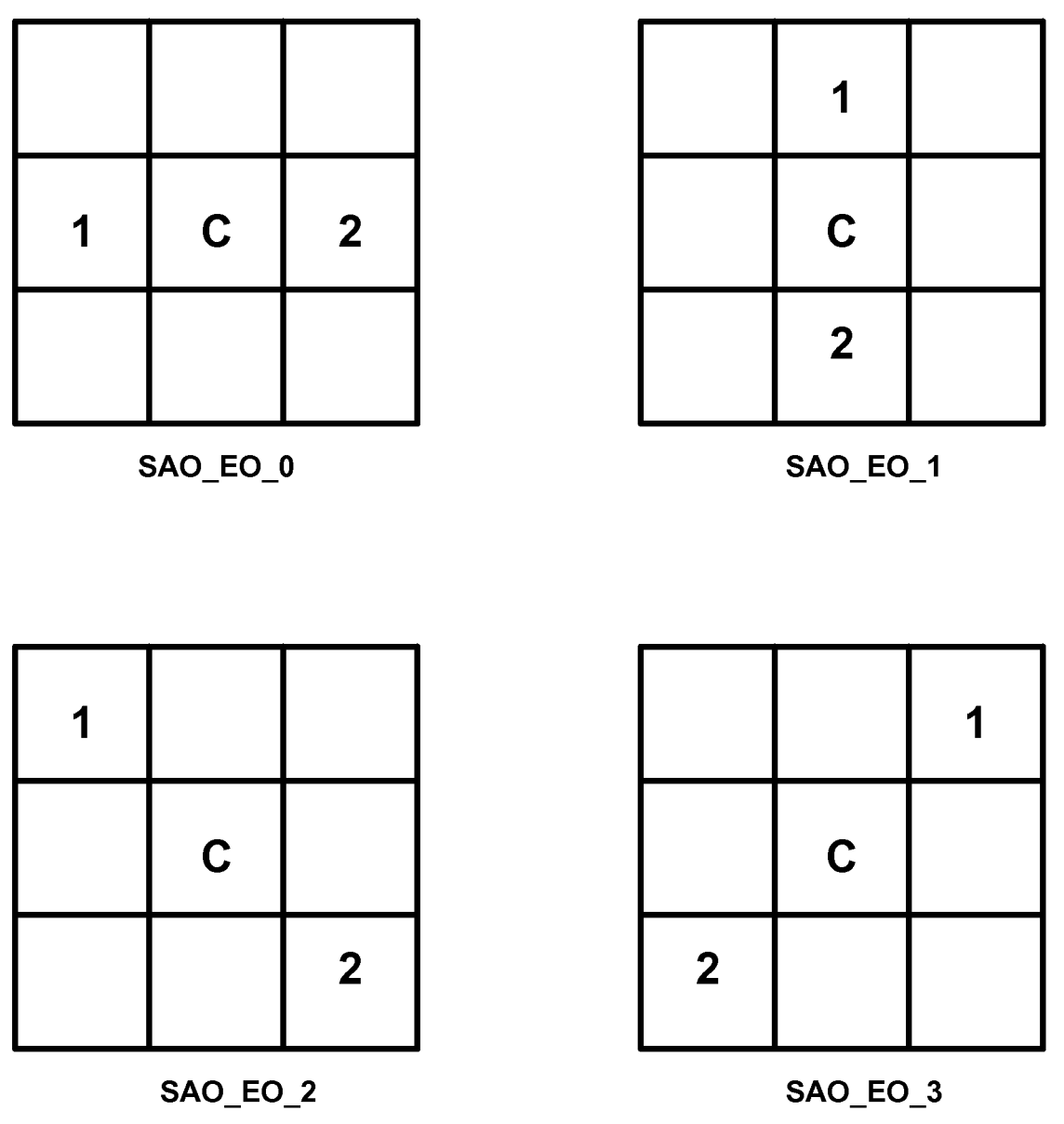

FIG. 3 is a conceptual diagram showing four possible edge offset types currently proposed for HEVC. The edge-offset type classifies each pixel based on edge information. For each of the edge classifications shown in FIG. 3, an edge type for the current pixel is calculated by comparing the value of the current pixel (C) to the values of neighboring pixels (1 and 2). For SAO edge offset of classification zero (SAO EO_0), the current pixel is compared to the left and right neighbor pixels. For SAO edge offset of classification one (SAO_EO_1), the current pixel is compared to the top and bottom neighbor pixels. For SAO edge offset of classification two (SAO_EO_2), the current pixel is compared to the upper left and bottom right neighbor pixels. For SAO edge offset of classification three (SAO_EO_3), the current pixel is compared to the bottom left and upper right neighbor pixels.

Initially, the edge type of the current pixel is assumed to be zero. If the value of current pixel C is equal to values of both the left and right neighbor pixels (1 and 2), the edge type remains at zero. If the value of the current pixel C is greater than the value of neighbor pixel 1, the edge type is increased by one. If the value of the current pixel C is less than the value of neighbor pixel 1, the edge type is decreased by one. Likewise, if the value of the current pixel C is less than the value of neighbor pixel 2, the edge type is increased by one, and if the value of the current pixel C is less than the value of the neighbor pixel 2, the edge type is decreased by 1.

As such, the current pixel C may have an edge type of either −2, −1, 0, 1, or 2. The edge type is −2 if the value of current pixel C is less than both values of neighbor pixels 1 and 2. The edge type is −1 if the value of current pixel C is less than one neighbor pixel, but equal to the other neighbor pixel. The edge type is 0 if the value of current pixel C is the same as both neighbor pixels, or if the value of current pixel C is greater than one neighbor pixel, but less than the other neighbor pixel. The edge type is 1 if the value of the current pixel C is greater than one neighbor pixel, but equal to the other neighbor pixel. The edge type is 2 if the value of the current pixel C is greater than both values of neighbor pixels 1 and 2. For each non-zero edge type value, four offset values are determined and signaled in the encoded video bitstream for use by a decoder (i.e., eoffset$_{-2}$, eoffset$_{-1}$, eoffset$_1$, eoffset$_2$).

Figure 6:
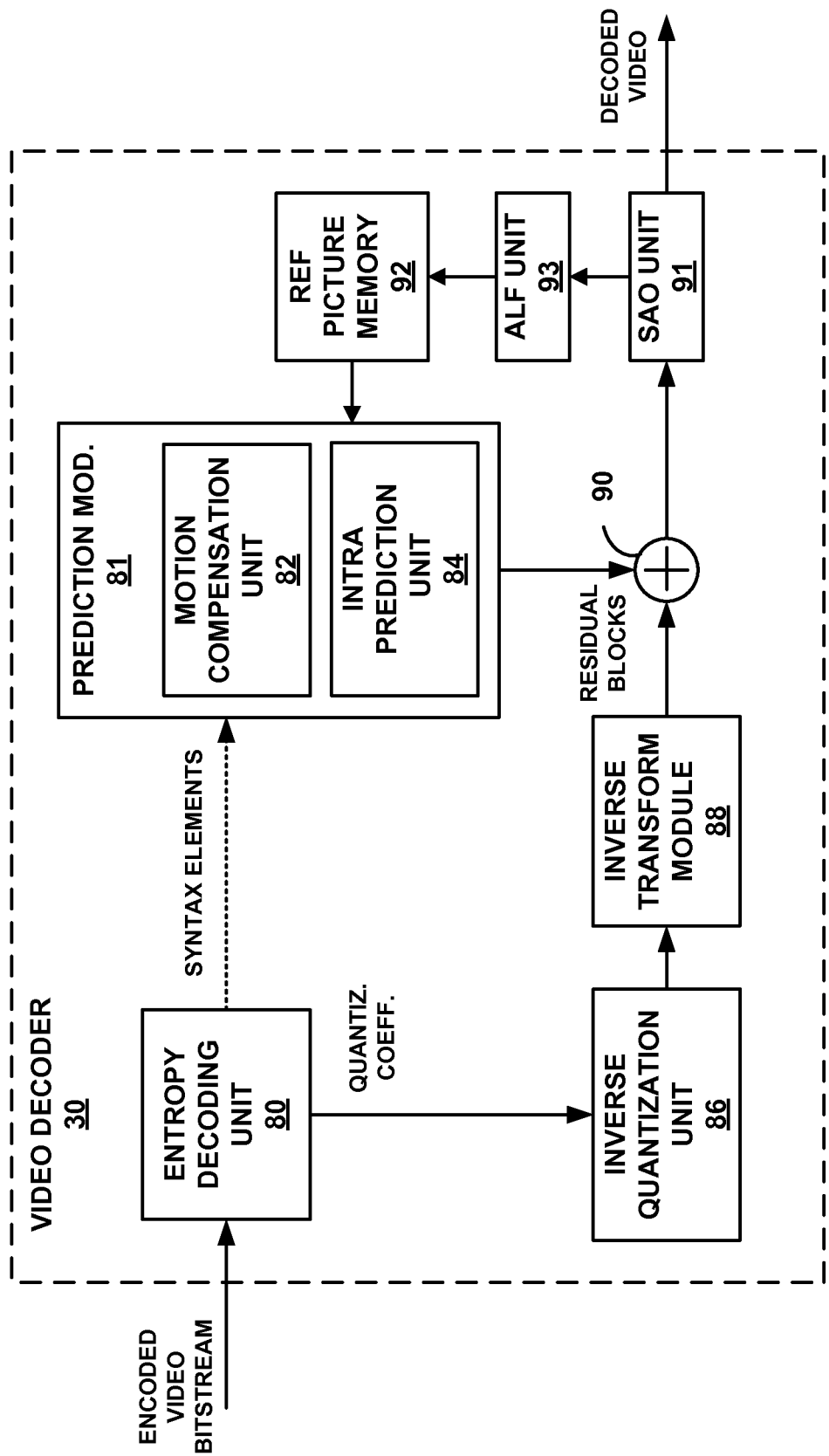
FIG. 6 is a block diagram illustrating an example video decoder that may implement the techniques described in this disclosure.

In view of the above description, for each edge offset classification, edge type values may be computed with the following equations:

EdgeType=0;

if ($C$>Pixel1)EdgeType=EdgeType+1;

if ($C$<Pixel1)EdgeType=EdgeType−1;

if ($C$>Pixel2)EdgeType=EdgeType+1;

if ($C$<Pixel2)EdgeType=EdgeType−1;

For band offset, pixels are classified into different bands based on intensity. FIG. 6 is a conceptual diagram showing example bands based on intensity value.

For band offset classification, pixels are categorized into 32 bands. The 16 bands in the center are classified into one group and the remaining bands are classified into a second group. For each group of bands, 16 offset values are determined and are signaled in the encoded video bitstream for use by a video decoder (i.e., boffset$_0$, . . . , boffset$_{15}$).

SAO with LCU-based syntax has been proposed. This technique supports picture-based SAO encoding for higher coding efficiency (bottom-up merge picture quadtree) and LCU-based encoding for lower complexity or sub-picture latency. Each LCU is allowed to change SAO parameters by sending its own SAO type and offsets. In some examples of LCU-based SAO encoding, each LCU may only use causal data to derive SAO parameters. For example, LCUs to the right and bottom cannot be utilized and neither can the last four pixel rows of each LCU due to deblocking.

Currently, in sample adaptive offset (SAO) filtering and adaptive loop filtering (ALF), a merge syntax element (i.e., merge_left or merge_up) can be transmitted from an encoder to a decoder to indicate if the filter parameters of a loop filter (e.g. an SAO filter or an ALF) for a current group of video blocks are to be borrowed from the filter parameters for a previously coded group of video blocks. Filter parameters can include, for example, filter coefficients for ALFs and offset values for SAO filters, as well as other information describing the filter. An example of other information describing a filter may include, for example, a filtering type for an SAO filter. A merge_left syntax element may, for example, indicate if the filter parameters for a current group of video blocks are to be copied from (i.e., borrowed or reused) the filter parameters for a previously coded group of video blocks to the left of the current group, while a merge_up syntax element can indicate if the filter parameters for the current group of video blocks are to be copied from filter parameters for a previously coded group of video blocks located above the current group. If one of the merge types is not chosen (i.e., the current parameters are not equal to the parameters for the left or upper already coded group of video blocks), then loop filter on/off indicators and offsets/coefficients are subsequently signaled. This ordering of signaling can, in some instances, require redundant signaling of merge signals when a lot LCUs or partitions are not applying filtering (or offset).

Tables 1 and 2 below show examples of the current signaling scheme for SAO filtering using CABAC. In the examples of Tables 1 and 2, merge_left and merge_up syntax elements are first transmitted from a video encoder and received by a video decoder (as shown in Table 1), and then if merge_left and merge_up flags indicate that the SAO filter parameters are not the same as the filter parameters for a left group of video blocks or an upper group of video blocks, the SAO offset values are transmitted from an encoder to a decoder as shown in Table 2.

TABLE 1

An Example of the Current Signaling Scheme for SAO Filtering Using CABAC

| | Descriptor |
|---|---|
| sao_unit_cabac( rx, ry, cIdx ){ | |
|   if( rx > 0 & & CtbAddrInSlice != 0 ) | |
|     sao_merge_left_flag | ae(v) |
|   if( !sao_merge_left_flag ) | |
|     if( ry > 0 & & ( AddrUp > 0 \|\| | |
|       slice_loop_filter_across_slices_enabled_flag ) ) | |

TABLE 1-continued

An Example of the Current Signaling Scheme for SAO Filtering Using CABAC

| | Descriptor |
|---|---|
|     sao_merge_up_flag | ae(v) |
|   if( !sao_merge_up_flag ) | |
|     sao_offset_cabac( rx, ry, cIdx ) | |
| } | |

TABLE 2

Another Example of the Current Signaling Scheme for SAO Filtering Using CABAC

| | Descriptor |
|---|---|
| sao_offset_cabac( rx, ry, cIdx ) { | |
|   sao_type_idx[ cIdx ][ rx ][ ry ] | ae(v) |
|   if( sao_type_idx[ cIdx ][ rx ][ ry ] = =5 ) | |
|     sao_band_position[ cIdx ][ rx ][ ry ] | ae(v) |
|   if( sao_type_idx[ cIdx ][ rx ][ ry ] != 0 ) | |
|     for( i = 0; i < 4; i++ ) | |
|       sao_offset[ cIdx ][ rx][ ry ][ i ] | ae(v) |
| } | |

In Table 2, the sao_type_idx element can have the following possible types (off/EO0/EO1/EO2/E3/BO signaling), where "off" indicates no SAO filtering is to be performed, EO indicates edge offset types, and BO indicates band offset types. As will be explained in more detail below, techniques of this disclosure include signaling whether the SAO filter is turned off prior to signaling the merge syntax elements.

Tables 3 and 4 below show examples of the current signaling scheme for ALF using CABAC. Similar to Tables 1 and 2 described above, in the examples of Tables 3 and 4, merge_left and merge_up syntax elements are first transmitted from a video encoder to a video decoder (as shown in Table 3), and then if merge_left and merge_up flags indicate that the ALF parameters are not to be borrowed from the filter parameters for a left group of video blocks or an upper group of video blocks, then an indication of whether ALF is enabled for a particular LCU is signaled from encoder to decoder (see e.g. alf_lcu_enable_flag in Table 3). If the alf_lcu_enable_flag indicates ALF is enabled for the LCU, then filter coefficients are transmitted from encoder to decoder as shown in Table 4. As will be explained in greater detail below, techniques of the present disclosure include signaling the enable information prior to signaling the merge flags.

TABLE 3

An Example of the Current Signaling Scheme for ALF Filtering Using CABAC

| | |
|---|---|
| alf_unit_cabac( rx, ry, cIdx ){ | |
|   if( rx > 0 & & CtbAddrInSlice != 0 ) | |
|     alf_merge_left_flag | u(1) |
|   if( !alf_merge_left_flag ) | |
|     if( ry > 0 & & ( AddrUp > 0 \|\| | |
|       slice_loop_filter_across_slices_enabled_flag ) ) | |
|       alf_merge_up_flag | u(1) |
|   if( !alf_merge_up_flag ) | |
|   { | |
|     alf_lcu_enable_flag[ cIdx ][ ry ][ rx ] | u(1) |
|     if (alf_lcu_enable_flag[ cIdx ][ ry ][ rx ]) | |
|       alf_info( rx, ry, cIdx ) | |
|   } | |
| } | |

TABLE 4

Another Example of the Current Signaling Scheme for ALF Filtering Using CABAC

| | Descriptor |
|---|---|
| alf_info( rx, ry, cIdx ) { | |
|   if(NumALFFiltersInStoredBuffer[cIdx] > 0) | |
|     alf_new_filter_set_flag | u(1) |
|   if( alf_new_filter_set_flag = = 0 && NumALFFiltersInStoredBuffer[cIdx] > 0) | |
|     alf_stored_filter_set_idx[ cIdx ] | u(v) |
|   else { | |
|     if( cIdx = = 0 ) { | |
|       alf_no_filters_minus1 | ue(v) |
|       if( alf_no_filters_minus1 = = 1 ) | |
|         alf_start_second_filter | ue(v) |
|       else if( alf_no_filters_minus1 > 1 ) | |
|         for( i = 1; i < 15; i++ ) | |
|           alf_filter_pattern_flag[ cIdx ][ ry ][ rx ][ i ] | u(1) |
|       if( alf_no_filters_minus1 > 0 ) | |
|         alf_pred_flag[ cIdx ][ ry ][ rx ] | u(1) |
|       for( i = 0; i < AlfNumFilters; i++ ) | |
|         alf_nb_pred_luma_flag[ cIdx ][ ry ][ rx ][ i ] | u(1) |
|       if( AlfNumFilters > 1 ) { | |
|         alf_min_kstart_minus1 | ue(v) |
|         for( i = 1; i < 4; i++ ) | |
|           alf_golomb_index_flag[ i ] | u(1) |
|       } | |
|       for( i = 0; i < AlfNumFilters; i++ ) | |
|         for( j = 0; j < AlfCodedLength; j++ ) | |
|           alf_filt_coeff[ cIdx ][ ry ][ rx ][ i ][ j ] | ge(v) |
|     } else | |
|       for( j = 0; j < AlfCodedLength; j++ ) | |
|         alf_filt_coeff[ cIdx ][ ry ][ rx ][ 0 ][ j ] | se(v) |
|   } | |
| } | |

According to techniques of the present disclosure, a syntax element indicating if a loop filter (e.g. SAO or ALF) is enabled can be transmitted from encoder to decoder prior to the merge syntax elements. Tables 5 and 6 show examples of how such techniques might be implemented. In the example of Tables 5 and 6, an sao_enable_flag indicating whether or not SAO is enabled for a group of video blocks (e.g. an LCU or a partition) is first transmitted by an encoder and received by a decoder. As shown in Table 5, if the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left group of video blocks or an upper group of video blocks, then the filter parameters can be signaled as shown in Table 6. In the example of Tables 5 and 6, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element.

TABLE 5

An Example Syntax Element indicating if a Loop Filter is Enabled

| | Descriptor |
|---|---|
| sao_unit_cabac( rx, ry, cIdx ){ | |
|   sao_enable_flag | u(1) |
|   if(sao_enable_flag) { | |
|     if( rx > 0 & & CtbAddrInSlice != 0 ) | |
|       sao_merge_left_flag | ae(v) |
|     if( !sao_merge_left_flag ) | |
|       if( ry > 0 & & ( AddrUp > 0 \|\| slice_loop_filter_across_slices_enabled_flag ) ) | |

TABLE 5-continued

An Example Syntax Element indicating if a Loop Filter is Enabled

| | Descriptor |
|---|---|
|         sao_merge_up_flag | ae(v) |
|       if( !sao_merge_up_flag ) | |
|         sao_offset_cabac( rx, ry, cIdx ) | |
|   } | |
| } | |

TABLE 6

Another Example Syntax Element indicating if a Loop Filter is Enabled

| | Descriptor |
|---|---|
| sao_offset_cabac( rx, ry, cIdx ) { | |
|   sao_type_idx[ cIdx ][ rx ][ ry ] | ae(v) |
|   if( sao_type_idx[ cIdx ][ rx ][ ry ] = =5 ) | |
|     sao_band_position[ cIdx ][ rx ][ ry ] | ae(v) |
|   if( sao_type_idx[ cIdx ][ ry ] != 0 ) | |
|     for( i = 0; i < 4; i++ ) | |
|       sao_offset[ cIdx ][ rx][ ry ][ i ] | ae(v) |
| } | |

Tables 7 and 8 show additional examples of how the techniques of this disclosure might be implemented for SAO filtering. In the examples of Tables 7 and 8, an sao_type_idx syntax parameter is sent first before a merge syntax elements or new offset values are sent. In instances where the sao_type_idx syntax element indicates SAO filtering is turned off, then merge syntax elements and offset values do no need to be transmitted. In instances when sao_type_idx syntax elements indicate SAO filtering is turned on, then merge syntax elements can be transmitted in the manner described above.

TABLE 7

Another Example Implementation for SAO

| | Descriptor |
|---|---|
| sao_unit_cabac( rx, ry, cIdx ){ | |
|   sao_type_idx[ cIdx ][ rx ][ ry ] | ae(v) |
|   if(sao_type_idx[ cIdx ][ rx ][ ry ] != 0) { | |
|     if( rx > 0 & & CtbAddrInSlice != 0 ) | |
|       sao_merge_left_flag | ae(v) |
|     if( !sao_merge_left_flag ) | |
|       if( ry > 0 & & ( AddrUp > 0 \|\| slice_loop_filter_across_slices_enabled_flag ) ) | |
|         sao_merge_up_flag | ae(v) |
|       if( !sao_merge_up_flag ) | |
|         sao_offset_cabac( rx, ry, cIdx ) | |
|   } | |
| } | |

TABLE 8

Another Example Implementation for SAO

| | Descriptor |
|---|---|
| sao_offset_cabac( rx, ry, cIdx ) { | |
|   if( sao_type_idx[ cIdx ][ rx ][ ry ] = =5 ) | |
|     sao_band_position[ cIdx ][ rx ][ ry ] | ae(v) |
|   if( sao_type_idx[ cIdx ][ rx ][ ry ] != 0 ) | |

TABLE 8-continued

Another Example Implementation for SAO

| | Descriptor |
|---|---|
| for( i = 0; i < 4; i++ )     sao_offset[ cIdx ][ rx ][ ry ][ i ] } | ae(v) |

Tables 9 and 10 show additional examples of how the techniques of this disclosure might be implemented for ALF. As shown in Table 9, an alf_lcu_enable_flag is first transmitted to indicate whether or not ALF is turned on or off for a group of video blocks. In the example of Table 9, the group of video blocks is an LCU, but other groups may also be used. If the alf_lcu_enable_flag indicates ALF is turned off for the LCU, then merge flags and other syntax elements identifying filter parameters do not need to be signaled. If the alf_lcu_enable_flag indicates ALF is turned on for the LCU and the merge flags indicate that the ALF parameters are not the same as the filter parameters for a left group of video blocks or an upper group of video blocks, then filter coefficients can be signaled in the manner shown in Table 10.

TABLE 9

An Example Implementation for ALF

| | |
|---|---|
| alf_unit_cabac( rx, ry, cIdx ){     alf_lcu_enable_flag[ cIdx ][ ry ][ rx ] | u(1) |
| if (alf_lcu_enable_flag[ cIdx ][ ry ][ rx ]){     if( rx > 0 && CtbAddrInSlice != 0 )         alf_merge_left_flag | u(1) |
| if( !alf_merge_left_flag )     if( ry > 0 && ( AddrUp > 0 ||     slice_loop_filter_across_slices_enabled_flag ) )         alf_merge_up_flag | u(1) |
| if( !alf_merge_up_flag )     {     if (alf_lcu_enable_flag[ cIdx ][ ry ][ rx ])         alf_info( rx, ry, cIdx )     }   } } | |

TABLE 10

Another Example Implementation for ALF

| | Descriptor |
|---|---|
| alf_info( rx, ry, cIdx ) {     if(NumALFFiltersInStoredBuffer[cIdx] > 0)         alf_new_filter_set_flag | u(1) |
| if( alf_new_filter_set_flag == 0 && NumALFFiltersInStoredBuffer[cIdx] > 0)     alf_stored_filter_set_idx[ cIdx ] | u(v) |
| else {     if( cIdx == 0 ) {         alf_no_filters_minus1 | ue(v) |
| if( alf_no_filters_minus1 == 1 )     alf_start_second_filter | ue(v) |
| else if( alf_no_filters_minus1 > 1 )     for( i = 1; i < 15; i++ )         alf_filter_pattern_flag[ cIdx ][ ry ][ rx ][ i ] | u(1) |
| if( alf_no_filters_minus1 > 0 )     alf_pred_flag[ cIdx ][ ry ][ rx ] | u(1) |
| for( i = 0; i < AlfNumFilters; i++ )     alf_nb_pred_luma_flag[ cIdx ][ ry ][ rx ][ i ] | u(1) |
| if( AlfNumFilters > 1 ) {     alf_min_kstart_minus1 | ue(v) |
| for( i = 1; i < 4; i++ ) | |

TABLE 10-continued

Another Example Implementation for ALF

| | Descriptor |
|---|---|
| alf_golomb_index_flag[ i ] } | u(1) |
| for( i = 0; i < AlfNumFilters; i++ )     for( j = 0; j < AlfCodedLength; j++ )         alf_filt_coeff[ cIdx ][ ry ][ rx ][ i ][ j ] } else | ge(v) |
| for( j = 0; j < AlfCodedLength; j++ )     alf_filt_coeff[ cIdx ][ ry ][ rx ][ 0 ][ j ] } } | se(v) |

Tables 11 and 12 show additional examples of how the techniques of this disclosure might be implemented for ALF. In the example of Tables 11 and 12, an alf_lcu_enable_flag is transmitted by a video decoder and received by a video encoder. After the alf_lcu_enable_flag is signaled, an alf_new_filter_flag signals whether or not new coefficients are sent. If the alf_new_filter_flag indicates new filter coefficients are to be send, then the filter coefficients are transmitted from encoder to decoder. If the alf_new_filter_flag indicates new filter coefficients are not to be sent, then another syntax element, such as a merge flag or filter index, can be transmitted from encoder to decoder to identify the filter coefficients that are to be used.

TABLE 11

An Example Including alf_lcu_enable_flag

| | |
|---|---|
| alf_unit_cabac( rx, ry, cIdx ){     alf_lcu_enable_flag[ cIdx ][ ry ][ rx ] | u(1) |
| if (alf_lcu_enable_flag[ cIdx ][ ry ][ rx ]){     if(NumALFFiltersInStoredBuffer[cIdx] > 0)         alf_new_filter_set_flag | u(1) |
| if (alf_new_filter_set_flag ) alf_info( rx, ry, cIdx )     else {     if( rx > 0 && CtbAddrInSlice != 0 )         alf_merge_left_flag | u(1) |
| if( !alf_merge_left_flag )     if( ry > 0 && ( AddrUp > 0 ||     slice_loop_filter_across_slices_enabled_flag ) )         alf_merge_up_flag | u(1) |
| if( !alf_merge_up_flag )     {     if( alf_new_filter_set_flag == 0 && NumALFFiltersInStoredBuffer[cIdx] > 0)         alf_stored_filter_set_idx[ cIdx ]     }   }   } } | u(v) |

TABLE 12

Another Example Including alf_lcu_enable_flag

| | Descriptor |
|---|---|
| alf_info( rx, ry, cIdx ) {     if( cIdx == 0 ) {         alf_no_filters_minus1 | ue(v) |
| if( alf_no_filters_minus1 == 1 )     alf_start_second_filter | ue(v) |
| else if( alf_no_filters_minus1 > 1 )     for( i = 1; i < 15; i++ )         alf_filter_pattern_flag[ cIdx ][ ry ][ rx ][ i ] | u(1) |
| if( alf_no_filters_minus1 > 0 )     alf_pred_flag[ cIdx ][ ry ][ rx ] | u(1) |
| for( i = 0; i < AlfNumFilters; i++ ) | |

TABLE 12-continued

Another Example Including alf_lcu_enable_flag

| | Descriptor |
|---|---|
| alf_nb_pred_luma_flag[ cIdx ][ ry ][ rx ][ i ] | u(1) |
| if( AlfNumFilters > 1 ) { | |
|   alf_min_kstart_minus1 | ue(v) |
|   for( i = 1; i < 4; i++ ) | |
|     alf_golomb_index_flag[ i ] | u(1) |
|   } | |
|   for( i = 0; i < AlfNumFilters; i++ ) | |
|     for( j = 0; j < AlfCodedLength; j++ ) | |
|       alf_filt_coeff[ cIdx ][ ry ][ rx ][ i ][ j ] | ge(v) |
| } else | |
|   for( j = 0; j < AlfCodedLength; j++ ) | |
|     alf_filt_coeff[ cIdx ][ ry ][ rx ][ 0 ][ j ] | se(v) |
| } | |

According to other examples, the alf_enable_flag and alf_new_filter_flag can be combined as follows:

Example 1 alf_enable_new_flag=0: off alf_enable_new_flag=1: on with new coefficients alf_enable_new_flag=2: on with merge or filter index

Example 2 alf_enable_new_flag=0: off alf_enable_new_flag=1: on with new coefficients alf_enable_new_flag=2: on with merge alf_enable_new_flag=3: on with filter index

Example 3 alf_enable_new_flag=0: off alf_enable_new_flag=1: on with new coefficients alf_enable_new_flag=2: on with filter index alf_enable_new_flag=3: on with merge As discussed above, e.g. Table 5, it has been proposed to decouple the sao_enable_flag (i.e., on/off information of SAO) to save sending merge_left and merge_up flags when SAO is off for each LCU.

TABLE 13

Another Example of Decoupling sao_enable_flag to Save Sending merge_left and merge_up flags when SAO is off for each LCU.

| | Descriptor |
|---|---|
| sao_unit_cabac( rx, ry, cIdx ){ | |
|   sao_enable_flag[rx][ry][cIdx] | u(1) |
|   if(sao_enable_flag[rx][ry][cIdx]) { | |
|     if( rx > 0 ) { | |
|       if( CtbAddrInSlice != 0 && | |
|         TileId[ CtbAddrTS ] = = TileId[ CtbAddrRStoTS[ CtbAddrRS − 1 ] ] ) | |
|         sao_merge_left_flag | ae(v) |
|     } | |
|     if( !sao_merge_left_flag ) { | |
|       if( ry > 0 ) { | |
|         if( ( ( CtbAddrTS − CtbAddrRStoTS [CtbAddrRS− PicWidthInCtbs] ) | |
|           <= CtbAddrInSlice ) && | |
|           ( TileId[ CtbAddrTS ] | |
|           = = TileId[ CtbAddrRStoTS[ CtbAddrRS− PicWidthInCtbs ] ] ) ) | |
|         sao_merge_up_flag | ae(v) |
|       } | |
|       if( !sao_merge_up_flag ) | |
|         sao_offset_cabac( rx, ry, cIdx ) | |
|     } | |
|   } | |
| } | |

In these cases, video encoder 20 need only send merge_left or merge_up flag only when neighboring LCU has enabled SAO, by checking whether left or upper LCU's sao_enable_flag is on or off. To remove a line buffer (i.e., memory for a row of video information) needed to check the sao_enable_flag of upper LCU, this disclosure further proposes modified syntax as follows (i.e., requiring a check of only left LCU's sao_enable_flag).

TABLE 14

Send merge_left or merge_up flag Only When Neighboring LCU Enables SAO

| | Descriptor |
|---|---|
| Sao_unit_cabac( rx, ry, cIdx ){ | |
|   sao_enable_flag[rx][ry][cIdx] | u(1) |
|   if(sao_enable_flag[rx][ry][cIdx]) { | |

TABLE 14-continued

Send merge_left or merge_up flag Only When Neighboring LCU Enables SAO

| | Descriptor |
|---|---|
| if( rx > 0 ) {<br>  if( CtbAddrInSlice != 0 &&<br>    TileId[ CtbAddrTS ] = = TileId[ CtbAddrRStoTS[ CtbAddrRS − 1 ] ]<br>&& sao_enable_flag[rx−1][ry][cIdx])<br>    sao_merge_left_flag<br>}<br>if( !sao_merge_left_flag ) {<br>  if( ry > 0 ) {<br>    if( ( ( CtbAddrTS − CtbAddrRStoTS [CtbAddrRS− PicWidthInCtbs] )<br>      <= CtbAddrInSlice ) &&<br>      ( TileId[ CtbAddrTS ]<br>      = = TileId[ CtbAddrRStoTS[ CtbAddrRS− PicWidthInCtbs ] ] ) &&<br>sao_enable_flag[rx][ry−1][cIdx])<br>    sao_merge_up_flag<br>  }<br>  if( !sao_merge_up_flag )<br>    sao_offset_cabac( rx, ry, cIdx )<br>  }<br>}<br>} | <br><br><br><br>ae(v)<br><br><br><br><br><br><br><br><br>ae(v) |

Furthermore, to remove the need for a line buffer for upper LCU row's SAO parameters, this disclosure further proposes to remove sao_merge_up_flag itself, which, in one example, leads to following syntax table.

TABLE 15

SAO Syntax with Removed sao_merge_up_flag

| | Descriptor |
|---|---|
| Sao_unit_cabac( rx, ry, cIdx ){<br>  sao_enable_flag[rx][ry][cIdx]<br>  if(sao_enable_flag[rx][ry][cIdx]) {<br>  if( rx > 0 ) {<br>    if( CtbAddrInSlice != 0 &&<br>      TileId[ CtbAddrTS ] = = TileId[ CtbAddrRStoTS[<br>CtbAddrRS − 1 ] ] && sao_enable_flag[rx−1][ry][cIdx])<br>    sao_merge_left_flag<br>  }<br>  if( !sao_merge_up_flag )<br>    sao_offset_cabac( rx, ry, cIdx )<br>  }<br>} | <br>u(1)<br><br><br><br><br><br>ae(v) |

As illustrated in the example of Table 15, in some examples when SAO enabled, an SAO merge mode may be limited to left CUs. In other words, some systems and methods may limit merge mode for ALF to the left neighboring CU. In this way, ALF information for the above CU may not need to be stored in a line buffer for use when performing ALF on CUs from a row/line below. Such a system may only need to store the CU immediately to the left of the current one.

An example method may include receiving a current video unit and a video unit adjacent left to the current video unit, parsing the received syntax elements to determine whether a type of filtering is enabled for the video unit adjacent left to the current video unit, in response to determining that the type of filtering is enabled for the video unit adjacent left to the current video block, determining whether to borrow a filter parameter for the current video unit from a filter parameter for the adjacent left video unit based on one or more merge syntax elements, and in direct response to determining that the filter parameter for the current video unit is not borrowed from the filter parameter for the adjacent left video unit, determining whether the filter parameter for the current video unit is borrowed from a filter parameter for an adjacent upper video unit based on the one or more merge syntax elements.

Another example method may include receiving a current video unit and a video unit adjacent left to the current video unit, parsing the received syntax elements to determine whether a type of filtering is enabled for the video unit adjacent left to the current video unit, in response to determining that the type of filtering is enabled for the video unit adjacent left to the current video unit, determining whether a filter parameter for the current video unit is borrowed from a filter parameter for the adjacent left video unit based on one or more merge syntax elements, and in response to determining that the filter parameter for the current video unit is not borrowed from the filter parameter for the adjacent left video unit, determining the filter parameter for the current video unit without determining whether the filter parameter for the current video unit is borrowed from a filter parameter for an adjacent upper video unit.

In the examples above, merge syntax elements (e.g. alf_merge_left or alf_merge_up) be removed such that only a filter index (e.g. filter_set_idx) are used to identify filters when new coefficients are not signaled. Additionally, the merge syntax elements can be combined with the filter index to form a new syntax element, where certain values of the new syntax element correspond to alf_merge_left or alf_merge_up while other values correspond to filter indexes. For example, alf_merge_left flag can be combined with alf_stored_filter_set_idx, where alf_stored_filter_set_idx=0 is equivalent with alf_merge_left flag.

Some examples of the systems and methods described herein may relate to Scalable Video Coding (SVC). SVC provides for the encoding of a high-quality video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. Similarly, some examples of the systems and methods described herein may relate to Multiview Video Coding (MVC). MVC may be used to encoding stereoscopic (two-view) video, as well as free viewpoint television and multi-view 3D television.

An example of SVC is the SVC process described in annex G of the H.264/AVC standard, which is hereby incorporated by reference in its entirety. SVC may be developed for, and applied, to other coding standards, such as HEVC. In SVC, one or more enhancement layers may be coded to augment a base layer, often to increase spatial or temporal resolutions at which the video data may be displayed. That is, the base layer may represent video data at a first low spatial or temporal resolution. Additional enhancement layers may augment the base layer to increase the spatial or temporal resolutions in comparison to the base layer. SVC may generally enable forward compatibility for older hardware in that the same bitstream can be consumed by basic video decoders that are capable of decoding a low resolution subset of the bitstream (e.g., the base layer) while more advanced video decoders may be able to decode the base layer in conjunction with additional layers to provide higher resolution video data. Option 2 may be implemented with respect to SVC to enable codebooks to be referenced by multiple layers. For example, codebooks from the base layer can be used to predict codebooks for use in one or more enhancement layers (e.g., differential prediction). In another example, the codebook used for the base layer may simply be reused for one or more enhancement layers.

Multiview Video Coding (MVC) is a video coding process for coding multiple views of video data. Like SVC, an example of an MVC process is defined as an annex to H.264/AVC. More specifically, an MVC process is described in annex H of the H.264/AVC standard, which is hereby incorporated by reference in its entirety. MVC may be developed for, and applied, to other coding standards, such as HEVC. In MVC, each view corresponds to a different perspective, or angle, at which corresponding video data of a common scene was captured. MVC provides for inter-view prediction (meaning prediction between two different views) and intra-view prediction (meaning prediction within the same view). Option 2 may be implemented with respect to MVC to enable codebooks to be referenced by multiple views. For example, codebooks from one view (e.g., a base view) can be used to predict the codebook to be used in one more different views. In another example, the codebook used for the base view may simply be reused for one or more other views.

In an example, an encoder may generate, for inclusion in an encoded bitstream, an enable syntax element, wherein the enable syntax element indicates whether a loop filter is turned on or turned off for a group of video blocks. The encoder may generate one or more additional syntax elements identifying parameters for the loop filter for the group of video blocks in response to the enable syntax element indicating the loop filter is turned on for the group of video blocks. These parameters may be used in conjunction with SVC and/or MVC, e.g., to turn on and off layers within an SVC video stream or to for signaling in an SVC base layer to indicate that the other layers are copies of the base layer. The parameters signaled may be used in conjunction with MVC to indicate information regarding multiple views. For example, the parameters may indicate if depth and/or multiple views are included in the bitstream. The parameters may also indicate if textures are being used.

Figure 5:
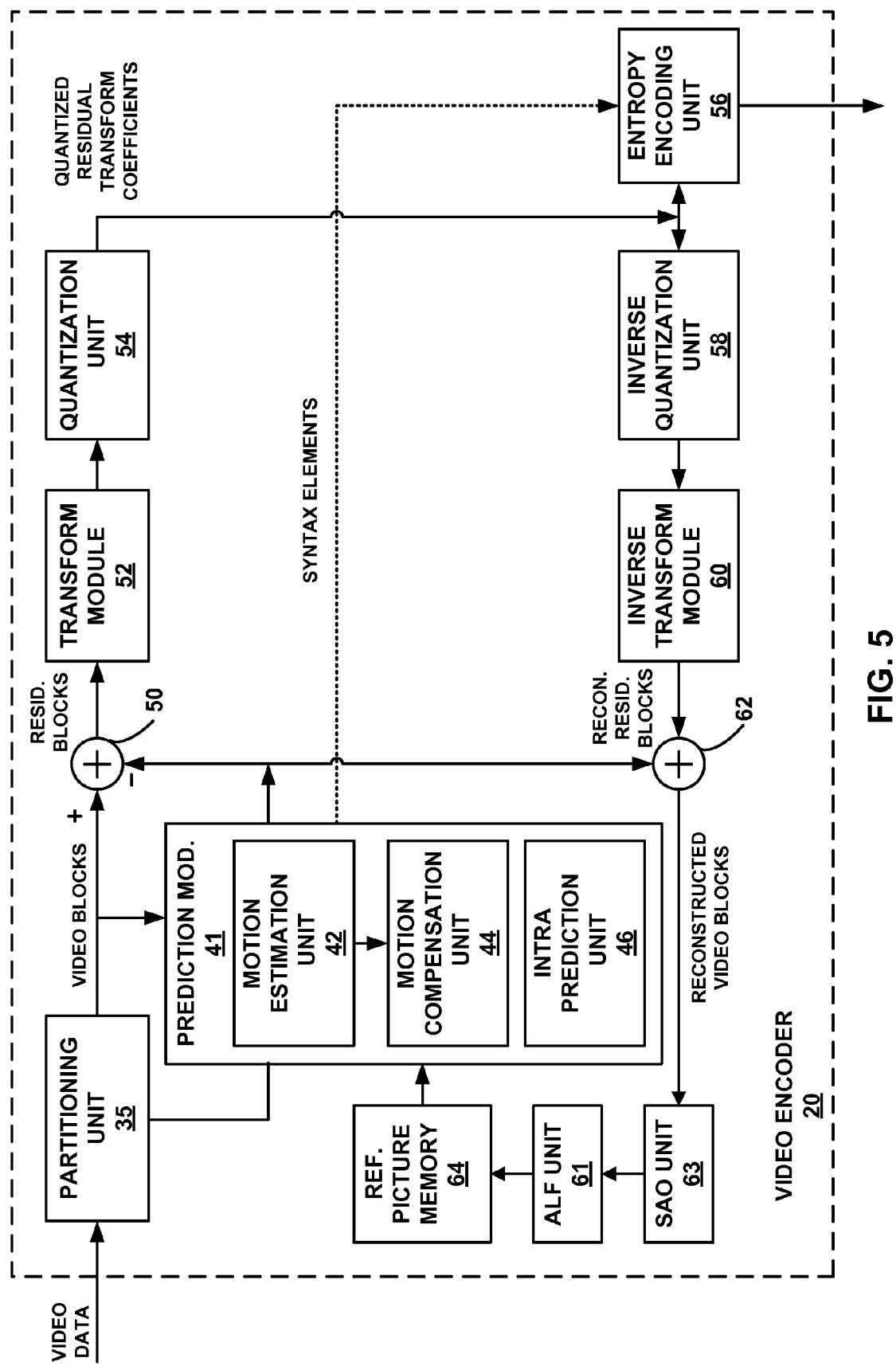
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may code an SAO on/off flag that is signaled first (e.g., at the LCU level) to indicate whether SAO is used for any blocks in the LCU. Video encoder 20 may, in another example, include an ALF on/off flag that is signaled first (e.g., at the LCU level) to indicate whether SAO is used for any blocks in the LCU.

In one example SAO implementation, each partition (which comprises a set of LCUs) can have one of three offset types (also called pixel classification): no offset, band classification based offset type 0/1, and edge classification based type 0/1/2/3. Each band classification offset type has 16 possible offset values, while each edge classification based type has four possible offset values. If one of these offset types is chosen to be used for the partition, information indicating the corresponding offset type and the offset values are sent to the decoder.

Accordingly, in one example of the disclosure, an SAO on/off flag may be signaled first (e.g., at the LCU level) to indicate whether SAO is used for any blocks in the LCU. In another example, an ALF on/off flag is signaled first (e.g., at the LCU level) to indicate whether SAO is used for any blocks in the LCU. The signaling may be performed by video encoder 20.

According to techniques of the present disclosure, a syntax element indicating if a loop filter (e.g. SAO or ALF) is enabled may be transmitted from video encoder 20 to video decoder 30 prior to the merge syntax elements. In the example, an sao_enable_flag indicating whether or not SAO is enabled for a group of video blocks (e.g. an LCU or a partition) is first transmitted by an encoder and received by a decoder. If the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left video block or an upper video block, then the filter parameters can be signaled. In an example, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 5, video encoder 20 includes a partitioning unit 35, prediction module 41, reference picture memory 64, summer 50, transform module 52, quantization unit 54, and entropy encoding unit 56. Video encoder 20 also includes ALF unit 61 and SAO unit 63 to perform the SAO techniques described in this disclosure. Prediction module 41 includes motion estimation unit 42, motion compensation unit 44, and intra prediction unit 46. For video block reconstruction, video encoder 20 also includes inverse quantization unit 58, inverse transform module 60, and summer 62. A deblocking filter (not shown in FIG. 5) may also be included to filter block boundaries to remove blockiness artifacts from reconstructed video. If desired, the deblocking filter would typically filter the output of summer 62.

Additional loop filters (in loop or post loop) may also be used in addition to the deblocking filter. Furthermore, the ordering of loop filters shown in FIG. 5 constitutes merely one example, as it is contemplated that other orderings might also be used.

As shown in FIG. 5, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

In an example, prediction module 41 may generate a syntax element indicating if a loop filter (e.g. SAO or ALF) is enabled. Such a syntax element may be encoded by entropy encoder unit 56. Accordingly, video encoder 20 may transmit the syntax element to video decoder 30 prior to the merge syntax elements. In the example, an sao_enable_flag indicating whether or not SAO is enabled for a group of video blocks (e.g. an LCU or a partition) is first transmitted by an encoder and received by a decoder. If the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left video block or an upper video block, then the filter parameters can be signaled. In an example, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element.

In an example video encoder 20 the prediction module 41 generates, for inclusion in an encoded bitstream, an enable syntax element. The enable syntax element indicates whether a loop filter is turned on or turned off for a group of video blocks. The prediction module 41 also generates one or more additional syntax elements identifying parameters for the loop filter for the group of video blocks in response to the enable syntax element indicating the loop filter is turned on for the group of video blocks. The video encoder 20 may also perform the loop filter for the group of video blocks according to the enable syntax element In some examples, the additional syntax elements include one or more merge syntax elements. The one or more merge syntax elements indicate whether the parameters for the loop filter for at least one block of the group of video blocks may be set equal to parameters for the loop filter for a previous group of video blocks such that the parameters for the loop filter are reused or borrowed from the parameters for the loop filter for a previous group of video blocks.

In an example prediction module 41 generates, for inclusion in the encoded bitstream, information for reconstructing a set of filter coefficients for the loop filter. The loop filter may be an SAO filter in some examples. Additionally, prediction module 41 may generate, for inclusion in the encoded bitstream, information for reconstructing offset values for the loop filter. In some examples, prediction module 41 may generate, for inclusion in the encoded bitstream, an SAO type syntax element, wherein the SAO type syntax element identifies a type of SAO filtering from a set of types.

In an example, the loop filter includes an ALF filter and the prediction module 41 may generate, for inclusion in the encoded bitstream, a filter syntax element signaling if information identifying new filter coefficients are present in the encoded bitstream. In response to the filter syntax element signaling that information identifying new filter coefficients is present in the encoded bitstream, generating, for inclusion in the encoded bitstream, the information. In an example, in response to a new filter syntax element signaling that information identifying new filter coefficients is not present in the encoded bitstream, the prediction module may generate, for inclusion in the encoded bitstream, one or more merge syntax elements and/or a filter index.

Intra prediction unit 46 within prediction module 41 may perform intra-predictive coding of the current video block relative to one or more neighboring blocks in the same frame or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In this manner, video encoder 20 of FIG. 3 represents an example of a video encoder configured to generate, for inclusion in an encoded bitstream, an enable syntax element, wherein the enable syntax element indicates whether a loop filter is turned on or turned off for a group of video blocks; and, in response to the enable syntax element indicating the loop filter is turned on for the group of video blocks, generating one or more additional syntax elements identifying parameters for the loop filter for the group of video blocks. The loop filter can be, for example, an adaptive loop filter (ALF) or a sample adaptive offset (SAO) filter. The additional syntax elements can include one or more merge syntax elements that indicate whether the parameters for the loop filter for the group of video blocks may be set equal to parameters for the loop filter for a previous group of video blocks such that the parameters for parameters for the loop filter are reused or borrowed from the parameters for the loop filter for a previous group of video blocks. When the loop filter is an ALF filter, video encoder 20 can generate, for inclusion in the encoded bitstream information for reconstructing a set of filter coefficients for the loop filter. When the loop filter is an SAO filter, video encoder 20 can generate, for inclusion in the encoded bitstream, information for reconstructing offset values for the loop filter. When the loop filter is an SAO filter, video encoder 20 can generate, for inclusion in the encoded bitstream, an SAO type syntax element that identifies a type of SAO filtering from a set of types, wherein the set of types does not include a "filtering off" type. When the loop filter comprises an ALF filter, video encoder 20 can generate, for inclusion in the encoded bitstream, a new filter syntax element signaling if information identifying new filter coefficients are present in the encoded bitstream; and, in response to the new filter syntax element signaling that information identifying new filter coefficients is present in the encoded bitstream, generate, for inclusion in the encoded bitstream, the information. In response to the new filter syntax element signaling that information identifying new filter coefficients is not present in the encoded bitstream, video encoder 20 can generate, for inclusion in the encoded bitstream, one or more merge syntax elements and/or a filter index.

When the loop filter is an ALF filter, a first value of the enable syntax element can indicate the ALF is turned off, a second value for the enable syntax element can indicate the ALF filter is turned on and the encoded bitstream includes information identifying new filter coefficients, and a third value for the enable syntax element can indicate the ALF filter is turned on and the encoded bitstream does not include information identifying new filter coefficients. The third syntax element can indicate filter coefficients for the ALF are being signaled via a merge syntax element. The third syntax element can also indicate filter coefficients for the ALF are being signaled via a filter index.

Video encoder 20 also represents an example of a video encoder configured to generate, for inclusion in an encoded bitstream, an SAO type syntax element, wherein the SAO type syntax element identifies a type of SAO filtering from a set of types, wherein the set of types includes a "filtering off" type, and in response to the SAO type syntax element identifying a type of SAO filtering other than the "filtering off" type, generating, for inclusion in the encoded bitstream, one or more additional syntax elements identifying parameters for an SAO filter for a group of video blocks. The additional syntax elements can include one or more merge syntax elements that indicate the parameters for the loop filter for the group of video blocks may be borrowed from the parameters for the loop filter for a previous group of video blocks. Video encoder 20 can also generate, for inclusion in the encoded bitstream, offset values for the SAO filter.

According to techniques of the present disclosure, a syntax element indicating if a loop filter (e.g. SAO or ALF) is enabled can be transmitted from video encoder 20 to video decoder 30 prior to the merge syntax elements. In an example, an sao_enable_flag indicating whether or not SAO is enabled for a group of video blocks (e.g. an LCU or a partition) is first transmitted by an encoder and received by a decoder. If the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left video block or an upper video block, then the filter parameters can be signaled. In an example, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element.

In one example, the concept relates to the introduction of an SAO on/off flag that may signaled first by source device 12 (e.g., at the LCU level) to indicate whether SAO is used for any blocks in the LCU. In another example, the concept relates to the introduction of an ALF on/off flag that is signaled first by source device 12 (e.g., at the LCU level) to indicate whether SAO is used for any blocks in the LCU.

In one example SAO implementation, each partition (which comprises a set of LCUs) can have one of three offset types (also called pixel classification): no offset, band classification based offset type 0/1, and edge classification based type 0/1/2/3. Each band classification offset type has 16 possible offset values, while each edge classification based type has four possible offset values. If one of these offset types is chosen to be used for the partition, information indicating the corresponding offset type and the offset values are sent to the decoder.

FIG. 6 is a block diagram illustrating an example video decoder 30 that may implement the techniques described in this disclosure. In the example of FIG. 6, video decoder 30 includes an entropy decoding unit 80, prediction module 81, inverse quantization unit 86, inverse transformation unit 88, summer 90, and reference picture memory 92. Video decoder 30 also includes SAO unit 91 and ALF unit 93 to perform the filtering techniques described in this disclosure. Prediction module 81 includes motion compensation unit 82 and intra prediction unit 84. Video decoder 30 may, in some examples, perform a decoding pass generally reciprocal to the encoding pass described with respect to video encoder 20 from FIG. 5. As explained above with reference to FIG. 5, additional loop filters may also be included in video decoder 30. Also, the ordering of loop filters shown in FIG. 6 are merely one example, as other orderings may also be used.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video slice level and/or the video block level.

When the video slice is coded as an intra-coded (I) slice, intra prediction unit 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

In an example, syntax element transmitted by video encoder 20 to video decoder 30, which may be transmitted prior to the merge syntax elements, may be processed by entropy decoding unit 80 and provided to prediction module 81. In the example, an sao_enable_flag indicating whether or not SAO is enabled for a group of video blocks (e.g. an LCU or a partition) is first transmitted by video encoder 20 and received by video decoder 30. If the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left video block or an upper video block, then the filter parameters can be signaled. In an example, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element.

In an example video decoder 30 the entropy decoding unit 80 receives an encoded bitstream that includes an enable syntax element. The enable syntax element indicates whether a loop filter is turned on or turned off for a group of video blocks. The entropy decoding unit 80 also receives one or more additional syntax elements identifying parameters for the loop filter for the group of video blocks in response to the enable syntax element indicating the loop filter is turned on for the group of video blocks. Additionally, the video decoder may perform the loop filter for the group of video blocks based on the received enable syntax element In an example, the additional syntax elements comprise one or more merge syntax elements, wherein the one or more merge syntax elements indicate whether the parameters for the loop filter for at least one block of the group of video blocks are reused from parameters for the loop filter for a previous group of video blocks.

In an example, entropy decoding unit 80 may receive an encoded bitstream, including information for reconstructing a set of filter coefficients for the loop filter. The received encoded bitstream may include information for reconstructing offset values for the loop filter, an SAO type syntax element, wherein the SAO type syntax element identifies a type of SAO filtering from a set of types. The entropy decoding unit 80 may receive an encoded bitstream that includes a filter syntax element signaling if information identifying new filter coefficients are present in the encoded bitstream. The received encoded bitstream may also include the information identifying new filter coefficients is not present in the encoded bitstream, generating, for inclusion in the encoded bitstream, one or more merge syntax elements and/or a filter index.

In an example, the loop filter comprises an ALF filter, and wherein a first value of the enable syntax element indicates the ALF is turned off, a second value for the enable syntax element indicates the ALF filter is turned on and the encoded bitstream includes information identifying new filter coefficients, and a third value for the enable syntax element indicates the ALF filter is turned on and the encoded bitstream does not include information identifying new filter coefficients. The third value for the enable syntax element indicates filter coefficients for the ALF are being signaled via a merge syntax element. The third value for the enable syntax element indicates filter coefficients for the ALF are being signaled via a filter index. These signaled signaled via the merge syntax elements may be received by video decoder 30 and decoded by entropy decoding unit 80.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform module 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 of FIG. 6 represents an example of a video encoder configured to receive in an encoded bitstream an enable syntax element, wherein the enable syntax element indicates whether a loop filter is turned on or turned off for a group of one or more video blocks; and, in response to the enable syntax element indicating the loop filter is turned on for the group of video blocks, receiving one or more additional syntax elements identifying parameters for the loop filter for the group of video blocks. The loop filter may be, for example, an adaptive loop filter (ALF) or a sample adaptive offset (SAO) filter. The additional syntax elements can include one or more merge syntax elements that indicate whether the parameters for the loop filter for the group of video blocks are reused from parameters for the loop filter for a previous group of video blocks. When the loop filter is an ALF filter, video decoder 30 can further receive information for reconstructing a set of filter coefficients for the loop filter.

When the loop filter is an ALF filter, video decoder 30 can also receive a new filter syntax element signaling if information identifying new filter coefficients are present in the encoded bitstream; and, in response to the new filter syntax element signaling that information identifying new filter coefficients is present in the encoded bitstream, video decoder 30 can receive the information. In response to the new filter syntax element signaling that information identifying new filter coefficients is not present in the encoded bitstream, video decoder 30 can receive one or more merge syntax elements and/or a filter index.

When the loop filter is an ALF filter, a first value of the enable syntax element can indicate the ALF is turned off, a second value for the enable syntax element can indicate the ALF filter is turned on and the encoded bitstream includes information identifying new filter coefficients, and a third value for the enable syntax element can indicate the ALF filter is turned on and the encoded bitstream does not include information identifying new filter coefficients. The third value can indicate filter coefficients for the ALF are being signaled via a merge syntax element. The third value can also indicate filter coefficients for the ALF are being signaled via a filter index.

When the loop filter is an SAO filter, video decoder 30 can receive information for reconstructing offset values for the loop filter. When the loop filter is an SAO filter, video decoder 30 can also receive an SAO type syntax element that identifies a type of SAO filtering from a set of types that does not include a "filtering off" type.

Video decoder 30 also represents an example of a video encoder configured to receive in an encoded bitstream an SAO type syntax element that identifies a type of SAO filtering from a set of types. The set of types can include a "filtering off" type. In response to the SAO type syntax element identifying a type of SAO filtering other than the "filtering off" type, video decoder 30 can receive additional syntax elements identifying parameters for an SAO filter for a group of one or more video blocks.

The additional syntax elements can include or more merge syntax elements that indicate the parameters for the loop filter for the group of video blocks are borrowed from the parameters for the loop filter for a previous group of video blocks. Video decoder 30 can also receive offset values for the SAO filter.

Figure 7:
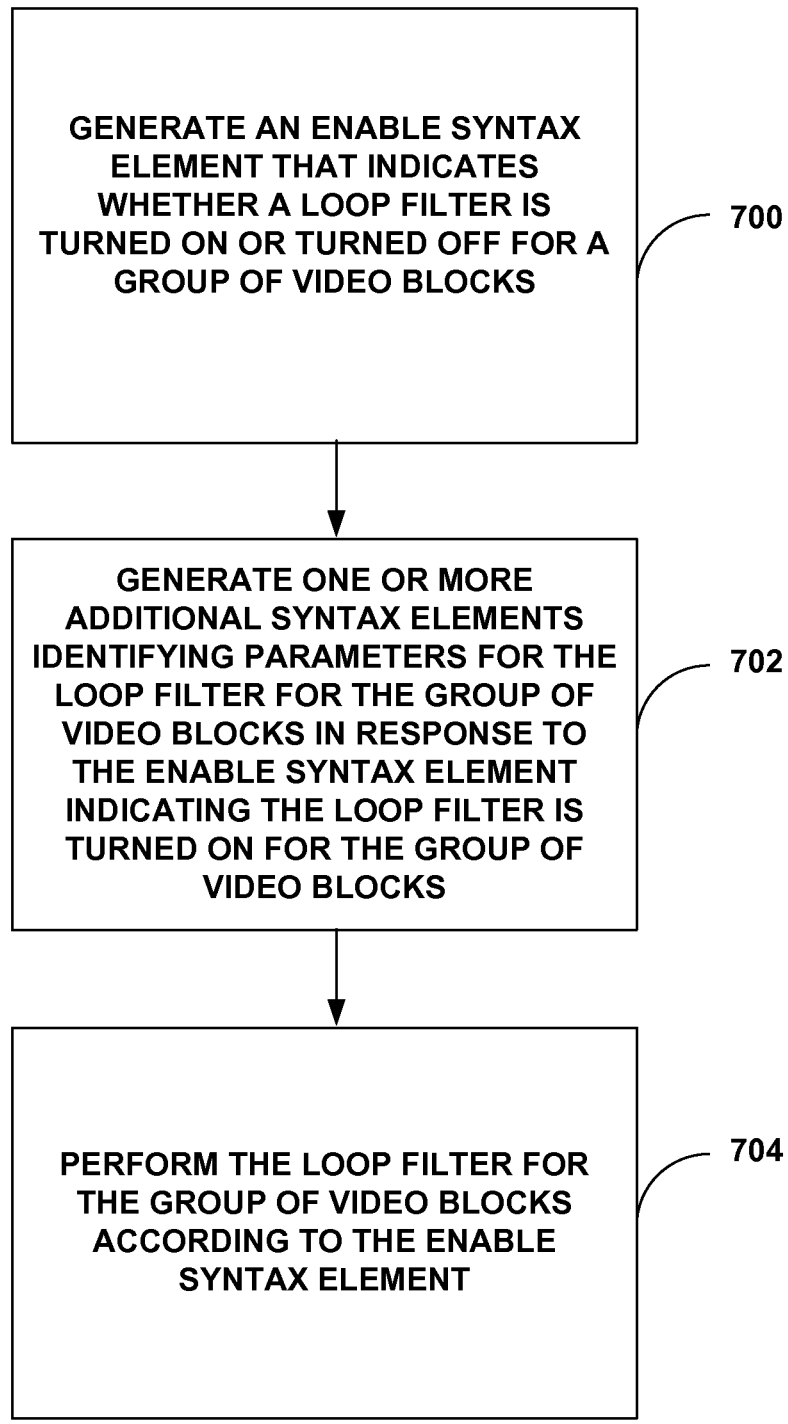
FIG. 7 is a flowchart illustrating an example method for a video encoder in accordance with one or more examples of this disclosure.

FIG. 7 is a flowchart illustrating an example method in accordance with one or more examples of this disclosure. In the illustrated example, a device for encoding video, such as, for example, a video encoder 20 may generate, for inclusion in an encoded bitstream, an enable syntax element. The enable syntax element may indicate whether a loop filter is turned on or turned off for a group of video blocks (700). In one example, one or more processors in video encoder 20 or other device for encoding video, may be configured to generate an enable syntax element for inclusion in an encoded bitstream. In an example, prediction module 41 may generate the syntax element.

In the illustrated example, the device for encoding video data, e.g., video encoder 20 may generate one or more additional syntax elements identifying parameters for the loop filter for the group of video blocks in response to the enable syntax element indicating the loop filter is turned on for the group of video blocks (702). Again, in one example, one or more processors in the device for encoding video, may be configured to generate one or more additional syntax elements identifying parameters for the loop filter for the group of video blocks in response to the enable syntax element indicating the loop filter is turned on for the group of video blocks. In an example, prediction module 41 may generate the syntax element.

According to techniques of the present disclosure, a syntax element indicating if a loop filter (e.g. SAO or ALF) is enabled can be transmitted from encoder to decoder prior to the merge syntax elements. Tables 5 and 6 show examples of how such techniques might be implemented. An sao_enable_flag indicating whether or not SAO is enabled for a group of video blocks (e.g. an LCU or a partition) is first transmitted by an encoder and received by a decoder. If the sao_enable_flag indicates SAO filtering is enabled, then one or more merge syntax elements (e.g. merge_left and merge_up) can be transmitted. If merge_left and merge_up flags indicate that the SAO filter parameters are not the same as the filter parameters for a left video block or an upper video block, then the filter parameters can be signaled. In an example, because the sao_enable_flag already indicates whether or not SAO filtering is turned on or off, the sao_type_idx syntax element does not need to include a "filtering off" indicator, thus potentially allowing for a bit savings when transmitting the sao_type_idx syntax element.

In some examples, the device for encoding video, e.g., video encoder 20, may performing the loop filter for the group of video blocks according to the enable syntax element (704). This may be performed by, for example, a device to for encoding video data, e.g., video encoder 20. Again, in one example, one or more processors in the device for encoding video, may be configured to generate information for reconstructing a set of filter coefficients for the loop filter for inclusion in the encoded bitstream.

Figure 8:
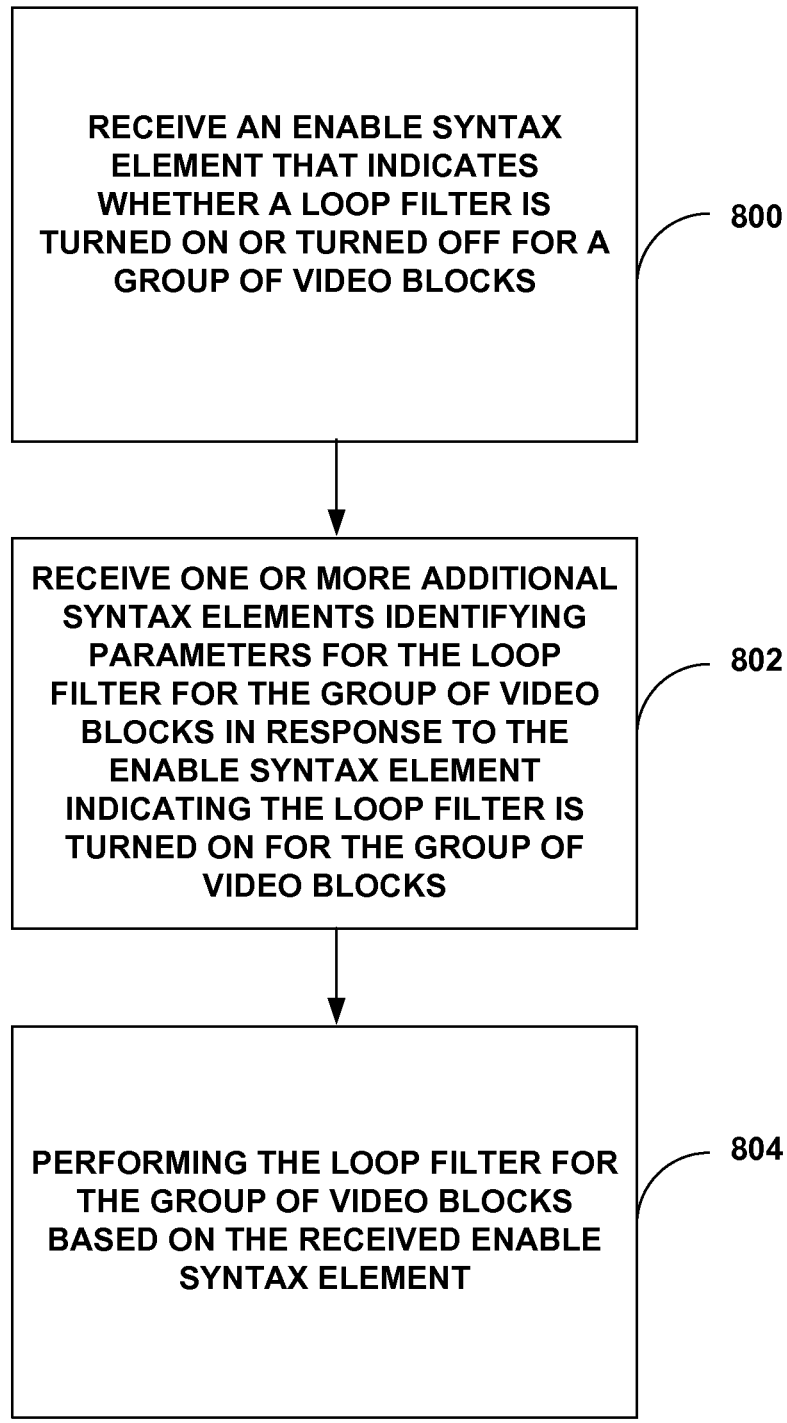
FIG. 8 is a flowchart illustrating an example method for a video decoder in accordance with one or more examples of this disclosure.

FIG. 8 is a flowchart illustrating an example method for a video decoder in accordance with one or more examples of this disclosure. In the illustrated example, a device for decoding video, such as, for example, a video decoder 30 may receive an enable syntax element in an encoded bitstream. The enable syntax element may indicate whether a loop filter is turned on or turned off for a group of video blocks (800). In one example, one or more processors in video decoder 30 or other device for decoding video, may be configured to decode an enable syntax element from an encoded bitstream. In an example, entropy decoder 80 may decode the syntax element.

In the illustrated example, the device for decoding video data, e.g., video decoder 30 may receive one or more additional syntax elements identifying parameters for the loop filter for the group of video blocks in response to the enable syntax element indicating the loop filter is turned on for the group of video blocks (802). Again, in one example, one or more processors in the device for decoding video, may be configured to generate one or more additional syntax elements identifying parameters for the loop filter for the group of video blocks in response to the enable syntax element indicating the loop filter is turned on for the group of video blocks. In an example, entropy decoder 80 may generate the syntax element.

In some examples, the device for decoding video, e.g., video decoder 30, may performing the loop filter for the group of video blocks based on the received enable syntax element (804). This may be performed by, for example, a device to for decoding video data, e.g., video decoder 30. Again, in one example, one or more processors in the device for decoding video, may be configured to generate information for reconstructing a set of filter coefficients for the loop filter for inclusion in the encoded bitstream.

The techniques discussed above are not intended to be mutually exclusive, and two or more techniques may be simultaneously implemented by a video encoder or video decoder. For example, a video encoder or video decoder may include multiple loop filters, such as both an SAO filter unit and an ALF filter unit, and each loop filter may implement one or more of the techniques of the described.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video, the method comprising:
receiving an enable syntax element in an encoded bitstream, wherein the enable syntax element indicates whether a sample adaptive offset (SAO) filter is turned on or turned off for one or more video blocks, wherein the one or more video blocks are less than an entire picture;
receiving one or more additional syntax elements identifying parameters for the SAO filter for the one or more video blocks in response to the enable syntax element indicating the SAO filter is turned on for the one or more video blocks, wherein the one or more additional syntax elements comprise one or more merge syntax elements, and the one or more merge syntax elements indicate whether the parameters for the SAO filter for at least one block of the one or more video blocks are reused from parameters for the SAO filter for another group of video blocks; and
performing the SAO filter for the one or more video blocks based on the received enable syntax element.

2. The method of claim 1, further comprising:
receiving information for reconstructing offset values for the SAO filter in the encoded bitstream; and
reconstructing the set of filter coefficients for the SAO filter based on the received information.

3. The method of claim 1, further comprising:
receiving an SAO type syntax element in the encoded bitstream, wherein the SAO type syntax element identifies a type of SAO filtering from a set of types.

4. The method of claim 1, wherein the enable syntax element and the one or more additional syntax elements are received for the one or more video blocks in a layer of a scalable video coding (SVC) video stream.

5. The method of claim 4, wherein the parameters for the one or more additional syntax elements are copied from the layer of the SVC video stream to another layer of the SVC video stream.

6. The method of claim 1, wherein the enable syntax element and the one or more additional syntax elements are received for the one or more video blocks in a view of a multiview video coding (MVC) video stream.

7. The method of claim 6, wherein the parameters for the one or more additional syntax elements are copied from the view of the MVC video stream to another view of the MVC video stream.

8. The method of claim 1, further comprising:
receiving a current video unit and a video unit adjacent left to the current video unit;
parsing the received enable syntax element to determine whether SAO filtering is enabled for the video unit adjacent left to the current video unit;
in response to determining that the SAO filtering is enabled for the video unit adjacent left to the current video unit, determining whether to borrow a filter parameter for the current video unit from a filter parameter for the adjacent left video unit based on the one or more merge syntax elements; and
in direct response to determining that the filter parameter for the current video unit is not borrowed from the filter parameter for the adjacent left video unit, determining whether the filter parameter for the current video unit is borrowed from a filter parameter for an adjacent upper video unit based on the one or more merge syntax elements.

9. The method of claim 1, further comprising:
receiving a current video unit and a video unit adjacent left to the current video unit;
parsing the received enable syntax element to determine whether SAO filtering is enabled for the video unit adjacent left to the current video unit;
in response to determining that the type of filtering is enabled for the video unit adjacent left to the current video unit, determining whether a filter parameter for the current video unit is borrowed from a filter parameter for the adjacent left video unit based on the one or more merge syntax elements; and
in response to determining that the filter parameter for the current video unit is not borrowed from the filter parameter for the adjacent left video unit, determining the filter parameter for the current video unit without determining whether the filter parameter for the current video unit is borrowed from a filter parameter for an adjacent upper video unit.

10. The method of claim 1, wherein the one or more video blocks are one of a largest coding unit or a partition.

11. The method of claim 1, the method being executable on a wireless communication device, wherein the device comprises:
a memory configured to store the encoded bitstream and video data including the one or more video blocks;
a processor configured to execute instructions to process the video data stored in the memory; and
a receiver configured to receive the encoded bitstream and the video data.

12. The method of claim 11, wherein the wireless communication device is a cellular telephone and the encoded bitstream and the video data are received by the receiver and modulated according to a cellular communication standard.

13. A device for decoding video data, the device comprising:
a memory configured to store the video data associated with one or more video blocks; and
one or more processors configured to:
receive an enable syntax element in an encoded bitstream, wherein the enable syntax element indicates whether a sample adaptive offset (SAO) filter is turned on or turned off for one or more video blocks, wherein the one or more video blocks are less than an entire picture; and
receive one or more additional syntax elements identifying parameters for the SAO filter for the one or more video blocks in response to the enable syntax element indicating the SAO filter is turned on for the one or more video blocks, wherein the one or more additional syntax elements comprise one or more merge syntax elements, and the one or more merge syntax elements indicate whether the parameters for the SAO filter for at least one block of the one or more video blocks are reused from parameters for the SAO filter for another group of video blocks; and
perform the SAO filter for the one or more video blocks based on the received enable syntax element.

14. The device of claim 13, wherein the one or more processors are further configured to:
receive information for reconstructing offset values for the SAO filter in the encoded bitstream; and
reconstruct the set of filter coefficients for the SAO filter based on the received information.

15. The device of claim 13, wherein the one or more processors are further configured to:

receive an SAO type syntax element in the encoded bitstream, wherein the SAO type syntax element identifies a type of SAO filtering from a set of types.

16. The device of claim 13, wherein the enable syntax element and the one or more additional syntax elements are received for the one or more video blocks in a layer of a scalable video coding (SVC) video stream.

17. The device of claim 16, wherein the parameters for the one or more additional syntax elements are copied from the layer of the SVC video stream to another layer of the SVC video stream.

18. The device of claim 13, wherein the enable syntax element and the one or more additional syntax elements are received for the one or more video blocks in a view of a multiview video coding (MVC) video stream.

19. The device of claim 18, wherein the parameters for the one or more additional syntax elements are copied from the view of the MVC video stream to another view of the MVC video stream.

20. The device of claim 13, wherein the one or more processors are further configured to:
receive a current video unit and a video unit adjacent left to the current video unit;
parsing the received enable syntax element to determine whether SAO filtering is enabled for the video unit adjacent left to the current video unit;
in response to determination that the SAO filtering is enabled for the video unit adjacent left to the current video unit, determine whether a filter parameter for the current video unit is borrowed from a filter parameter for the adjacent left video unit based on the one or more merge syntax elements; and
in direct response to determination that the filter parameter for the current video unit is not borrowed from the filter parameter for the adjacent left video unit, determine whether the filter parameter for the current video unit is borrowed from a filter parameter for an adjacent upper video unit based on the one or more merge syntax elements.

21. The device of claim 13, wherein the one or more processors are further configured to:
receive a current video unit and a video unit adjacent left to the current video unit;
parsing the received enable syntax element to determine whether SAO filtering is enabled for the video unit adjacent left to the current video unit;
in response to determination that the type of filtering is enabled for the video unit adjacent left to the current video unit, determine whether a filter parameter for the current video unit is borrowed from a filter parameter for the adjacent left video unit based on the one or more merge syntax elements; and
in response to determination that the filter parameter for the current video unit is not borrowed from the filter parameter for the adjacent left video unit, determine the filter parameter for the current video unit without determining whether the filter parameter for the current video unit is borrowed from a filter parameter for an adjacent upper video unit.

22. The device of claim 13, wherein the one or more video blocks are one of a largest coding unit or a partition.

23. The device of claim 13, wherein the device is a wireless communication device, further comprising:
a receiver configured to receive the encoded bitstream and the video data.

24. The device of claim 23, wherein the wireless communication device is a cellular telephone and the encoded bitstream and the video data are received by the receiver and modulated according to a cellular communication standard.

25. A method of encoding video, the method comprising:
generating, for inclusion in an encoded bitstream, an enable syntax element, wherein the enable syntax element indicates whether a sample adaptive offset (SAO) filter is turned on or turned off for one or more video blocks, wherein the one or more video blocks are less than an entire picture;
generating one or more additional syntax elements identifying parameters for the SAO filter for the one or more video blocks in response to the enable syntax element indicating the SAO filter is turned on for the one or more video blocks, wherein the additional syntax elements comprise one or more merge syntax elements, and the one or more merge syntax elements indicate whether the parameters for the SAO filter for at least one block of the one or more video blocks are reused from parameters for the SAO filter for another group of video blocks; and
performing the SAO filter for the group of video blocks according to the enable syntax element.

26. The method of claim 25, further comprising:
generating, for inclusion in the encoded bitstream, information for reconstructing offset values for the SAO filter.

27. The method of claim 25, w further comprising:
generating, for inclusion in the encoded bitstream, an SAO type syntax element, wherein the SAO type syntax element identifies a type of SAO filtering from a set of types.

28. The method of claim 25, wherein the one or more video blocks are one of a largest coding unit or a partition.

29. The method of claim 25, the method being executable on a wireless communication device, wherein the device comprises:
a memory configured to store the encoded bitstream and video data including the one or more video blocks;
a processor configured to execute instructions to process the video data stored in the memory; and
a transmitter configured to transmit the encoded bitstream and the video data.

30. The method of claim 29, wherein the wireless communication device is a cellular telephone and the encoded bitstream and the video data are transmitted by the transmitter and modulated according to a cellular communication standard.

31. A device for encoding video data, the device comprising:
a memory configured to store the video data associated with one or more video blocks; and
one or more processors configured to:
generate, for inclusion in an encoded bitstream, an enable syntax element, wherein the enable syntax element indicates whether a sample adaptive offset (SAO) filter is turned on or turned off for one or more video blocks, wherein the one or more video blocks are less than an entire picture;
generate one or more additional syntax elements identifying parameters for the SAO filter for the one or more video blocks in response to the enable syntax element indicating the SAO filter is turned on for the one or more video blocks, wherein the one or more additional syntax elements comprise one or more merge syntax elements, and the one or more merge syntax elements indicate whether the parameters for the SAO filter for at least one block of the one or more video blocks are reused from parameters for the SAO filter for another group of video blocks; and
performing the SAO filter for the one or more video blocks according to the enable syntax element.

32. The device of claim 31, wherein the one or more processors are further configured to:
generate, for inclusion in the encoded bitstream, information for reconstructing offset values for the SAO filter.

33. The device of claim 31, wherein the one or more processors are further configured to:
generate, for inclusion in the encoded bitstream, an SAO type syntax element, wherein the SAO type syntax element identifies a type of SAO filtering from a set of types.

34. The device of claim 31, wherein the one or more video blocks are one of a largest coding unit or a partition.

35. The device of claim 31, wherein the device is a wireless communication device, further comprising:
a transmitter configured to transmit the encoded bitstream and the video data.

36. The device of claim 35, wherein the wireless communication device is a cellular telephone and the encoded bitstream and the video data are transmitted by the transmitter and modulated according to a cellular communication standard.

37. A non-transitory computer-readable storage medium storing instructions that, when executed, cause one or more processors to:
generate, for inclusion in an encoded bitstream, an enable syntax element, wherein the enable syntax element indicates whether a sample adaptive offset (SAO) filter is turned on or turned off for one or more video blocks, wherein the one or more video blocks are less than an entire picture;
generate one or more additional syntax elements identifying parameters for the SAO filter for the one or more video blocks in response to the enable syntax element indicating the SAO filter is turned on for the one or more video blocks, wherein the one or more additional syntax elements comprise one or more merge syntax elements, and the one or more merge syntax elements indicate whether the parameters for the SAO filter for at least one block of the one or more video blocks are reused from parameters for the SAO filter for another group of video blocks; and
perform the SAO filter for the one or more video blocks according to the enable syntax element.

38. The non-transitory computer-readable storage medium of claim 37, further comprising instructions causing the one or more processors to generate, for inclusion in the encoded bitstream, information for reconstructing offset values for the SAO filter.

39. The non-transitory computer-readable storage medium of claim 37, wherein the one or more video blocks are a largest coding unit or one of a partition.

* * * * *